United States Patent
Seo et al.

(10) Patent No.: US 7,236,474 B2
(45) Date of Patent: Jun. 26, 2007

(54) APPARATUS AND METHOD FOR REPORTING QUALITY OF DOWNLINK CHANNEL IN W-CDMA COMMUNICATION SYSTEMS SUPPORTING HSDPA

(75) Inventors: Myeong-Sook Seo, Suwon-shi (KR); Hyeon-Woo Lee, Suwon-shi (KR); Kook-Heui Lee, Songnam-shi (KR); Sung-Ho Choi, Songnam-shi (KR); Ju-Ho Lee, Suwon-shi (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1123 days.

(21) Appl. No.: 10/287,241

(22) Filed: Nov. 4, 2002

(65) Prior Publication Data

US 2003/0123396 A1    Jul. 3, 2003

(30) Foreign Application Priority Data

Nov. 2, 2001    (KR) ................. 10-2001-0069026

(51) Int. Cl.
*H04Q 7/20*    (2006.01)
*H04Q 7/34*    (2006.01)

(52) U.S. Cl. ............... 370/329; 370/328; 370/330; 370/313; 370/314; 370/332; 370/341; 455/67.11; 455/522; 455/422.1; 455/403; 455/67.13; 455/500; 455/517

(58) Field of Classification Search ........... 370/329, 370/328, 330, 313, 314, 332, 341; 455/522, 455/69, 67.11, 422.1, 403, 426.1, 426.2, 423, 455/424, 425, 68, 500, 517, 67.13, 550.1
See application file for complete search history.

(56) References Cited

U.S. PATENT DOCUMENTS

| | | | |
|---|---|---|---|
| 5,995,496 A | * | 11/1999 | Honkasalo et al. ......... 370/318 |
| 6,912,228 B1 | * | 6/2005 | Dahlman et al. .......... 370/441 |
| 2005/0208961 A1 | * | 9/2005 | Willenegger ............. 455/522 |
| 2006/0135063 A1 | * | 6/2006 | Katz ..................... 455/25 |

* cited by examiner

*Primary Examiner*—Keith Ferguson
(74) *Attorney, Agent, or Firm*—The Farrell Law Firm

(57) ABSTRACT

An apparatus for reporting downlink channel quality in a high-speed packet communication system. A channel analyzer measures downlink channel quality from a received reference channel signal. A controller determines whether a current TTI (Transmission Time Interval) is a TTI corresponding to a multiple of a first TTI or a TTI corresponding to a multiple of a second TTI. If the current TTI is a TTI corresponding to a multiple of the first TTI, the controller determines CQ (Channel Quality) refreshment information for a downlink channel received from the Node B based on the measured downlink channel quality, and if the current TTI is a TTI corresponding to a multiple of the second TTI, the controller determines CQ refinement information for the downlink channel based on the measured downlink channel quality. A CQ information transmitter generates CQ refreshment information or CQ refinement information under the control of the controller, and transmits the generated CQ refreshment information or CQ refinement information over an uplink.

24 Claims, 21 Drawing Sheets

APPARATUS AND METHOD FOR REPORTING QUALITY OF DOWNLINK CHANNEL IN W-CDMA COMMUNICATION SYSTEMS SUPPORTING HSDPA

PRIORITY

This application claims priority to an application entitled "Apparatus and Method for Reporting Quality of Downlink Channel in W-CDMA Communication Systems Supporting HSDPA" filed in the Korean Industrial Property Office on Nov. 2, 2001 and assigned Serial No. 2001-69026, the contents of which are hereby incorporated by reference.

BACKGROUND OF THE INVENTION

1. Field of the Invention

The present invention relates generally to an HSDPA communication system, and in particular, to an apparatus and method for reporting a channel quality of a downlink to a Node B by a UE in an HSDPA service.

2. Description of the Related Art

In general, HSDPA (High Speed Downlink Packet Access) refers to a technique for transmitting data using HS-DSCH (High Speed-Downlink Shared Channel), a downlink data channel for supporting high-speed downlink packet transmission, and its associated control channels in a UMTS (Universal Mobile Telecommunication System) communication system. AMC (Adaptive Modulation and Coding), HARQ (Hybrid Automatic Retransmission Request), and FCS (Fast Cell Selection) techniques have been proposed in order to support the HSDPA. The AMC, HARQ and FCS techniques will be described herein below.

First, the AMC will be described. The AMC is a data transmission technique for adaptively determining a modulation technique and a coding technique of a data channel according to a channel condition between a Node B and a UE (User Equipment), thus to increase the overall utilization efficiency of the Node B. Therefore, the AMC supports a plurality of modulation techniques and coding techniques, and modulates and codes a data channel signal by combining the modulation techniques and the coding techniques. Commonly, each combination of the modulation techniques and the coding techniques is called "MCS (Modulation and Coding Scheme)," and there are defined a plurality of MCS levels of #1 to #n according to the number of the MCSs. That is, the AMC adaptively determines an MCS level according to a channel condition of a UE and a Node B to which the UE is wirelessly connected, thereby increasing the entire utilization efficiency of the Node B.

Next, the HARQ will be described, especially n-channel SAW HARQ (Stop and Wait Hybrid Automatic Retransmission Request). The HARQ newly proposes the following two schemes in order to increase transmission efficiency of the existing ARQ (Automatic Retransmission Request). First, a retransmission request and a response of the request are exchanged between a UE and a Node B. Second, defective data is temporarily stored, and combined with retransmitted data corresponding to the defective data. Further, the HSDPA has introduced the n-channel SAW HARQ in order to make up for a shortcoming of the conventional SAW ARQ. The SAW ARQ does not transmit the next packet data until it receives ACK for the previous packet data. Therefore, in some cases, the SAW ARQ must await ACK, although it can currently transmit the next packet data. However, in the n-channel SAW HARQ, the next packet data is continuously transmitted before ACK for the previous packet data is received, thereby increasing utilization efficiency of channels. That is, if n logical channels are established between a UE and a Node B, and the n logical channels can be identified by time and unique channel numbers, then the UE can recognize a channel over which packet data was received, and rearrange the received packets in the right reception order, or soft-combine the received packets.

Finally, the FCS will be described. The FCS is a technique for fast selecting a cell having the best channel condition among a plurality of cells, when a UE supporting the HSDPA (hereinafter referred to as "HSDPA UE") is located in a cell overlapping region, or a soft handover region. Specifically, in the FCS, if an HSDPA UE enters a cell overlapping region between an old Node B and a new Node B, the UE establishes radio links to a plurality of cells, i.e., the old Node B and the new Node B. Here, a set of the cells to which the UE has established the radio links is called an "active set." The UE reduces overall interference by receiving HSDPA packet data only from the cell maintaining the best channel condition among the cells included in the active set. Here, a cell in the active set, which transmits HSDPA packet data due to its best channel condition, is called a "best cell," and the UE periodically checks channel conditions of the cells in the active set and transmits a best cell indicator to the cells belonging to the active set in order to replace the current best cell with a new best cell having the better channel condition. The best cell indicator includes a cell ID of a cell selected as the best cell, and the cells in the active set receive the best cell indicator and detect the cell ID included in the best cell indicator. Each of the cells in the active set determines whether the received best cell indicator includes its own cell ID. As a result of the determination, if the best cell indicator includes its own cell ID, the corresponding cell transmits packet data to the UE over HS-DSCH.

FIG. 1 schematically illustrates a downlink channel structure in a general HSDPA communication system. Referring to FIG. 1, a downlink dedicated physical channel (DPCH) includes fields defined in the exiting CDMA (Code Division Multiple Access) communication system, e.g., a Release-99 system, and an HS-DSCH indicator (HI) indicating whether there is HSDPA data to be received at a UE. The HI transmitted over the downlink DPCH not only informs whether there is HSDPA data to be received at a corresponding UE, but also informs a channelization code of a shared control channel (SHCCH) that should transmit control information for HS-DSCH over which the HSDPA packet data is actually transmitted. If necessary, a part of HS-DSCH control information, e.g., such control information as an MCS level may be transmitted over the HI.

For example, in the case where the HSDPA packet data is transmitted in a unit of N (=N1+N2) slots (i.e., HSDPA Transmission Time Interval (TTI)=N slots), if a slot format is fixed in the TTI, the HI is separately transmitted at N1 slots and a part for transmitting the HI at the remaining N2 slots is transmitted at N2 slots on a DTX (Discontinuous Transmission) basis. For example, in FIG. 1, when the HSDPA packet data is transmitted in 3 slots unit (i.e., 1 TTI=3 slots), the HI is transmitted at one of the 3 slots. Now, reference will be made to the remaining two slots where the HI is not transmitted. A slot in one TTI, for transmitting the HI, must have an HI field. Therefore, if there exists packet data that a UE must receive, corresponding HI bits are inserted in the HI field before being transmitted. In contrast, if there exists no packet data that the UE must receive, the HI field undergoes DTX. However, the other slots in the TTI, which are not required to transmit the HI, i.e., the remaining two slots can be managed in the following two methods. The two slots in the TTI, which are not required to transmit the HI, may not have an HI field in slot structure. If the remaining two slots not transmitting the HI have the HI fields, the HI fields will undergo DTX, since they do not transmit the HI. However, if a Node B previously recognizes the slots which do not transmit the HI, it is not necessary to assign the HI fields to the corresponding slots. Therefore, the remaining two slots not transmitting the HI do not have the HI fields, and instead, have the same slot format as the DPCH slot format of the existing non-HSDPA communication system, e.g., Release-99 system. That is, a first method is to fix a slot format in the TTI and assign an HI field to each slot in the TTI, while a second method is to adaptively control the slot format in the TTI.

Here, HS-DSCH control information is transmitted over SHCCH, and the HS-DSCH control information transmitted over the SHCCH includes:

(1) Transport Format and Resource related Information (TFRI): this indicates MCS level, HS-DSCH channelization code information and transport format information, all to be used for HS-DSCH.

(2) HARQ information (a) HARQ processor number: in n-channel SAW HARQ, this indicates a channel to which specific packet data belongs among logical channels for HARQ.

(b) HARQ packet number: in the FCS, if a best cell is changed, a unique number of downlink packet data is informed to a UE so that the UE can inform a selected new best cell of a transmission state of the HSDPA data.

(3) CRC (Cyclic Redundancy Check)

CRC is generated from the TFRI, HARQ information, and UE ID (Identity). The UE ID servers as an identifier of a UE which must receive corresponding SHCCH. Therefore, the CRC is used not only to detect an error in the SHCCH but also to determine whether a UE has decoded SHCCH assigned to the UE itself.

Further, the SHCCH can be assigned one or more channelization codes. For example, in FIG. 1, the number of SHCCHs that can be assigned to UEs is a maximum of 4. Therefore, HI of the DPCH not only informs whether there exists HSDPA packet data to be received, and but also informs information on SHCCH that a corresponding UE must receive. Since the number of assignable SHCCHs is a maximum of 4, a 2-bit HI can be used to indicate information on the SHCCH that the UE must receive. For example, the UE receives SHCCH#1 for HI=00, SHCCH#2 for HI=01, SHCCH#3 for HI=10, and SHCCH#4 for HI=11. In addition, the HS-DSCH is a channel over which HSDPA packet data is transmitted from the Node B to the UE.

Now, a description will be made as to a process of receiving an HSDPA service by a UE using the above-stated channels DPCH, SHCCH and HS-DSCH.

First, the UE receives a downlink DPCH signal and decodes bits transmitted by an HI field. If the HI field undergoes DTX, the UE recognizes that there exists no HSDPA packet data to receive, and waits until the next TTI while receiving only a DPCH signal. However, if a specific bit value is transmitted as the HI, the UE recognizes that there exists HSDPA data to receive, and receives a corresponding SHCCH signal according to the HI bit value. Thereafter, the UE reads the corresponding SHCCH signal, and extracts MCS level, channelization code and HARQ-related control information for HS-DSCH, needed to demodulate an HS-DSCH signal. Finally, the UE receives the HS-DSCH signal using the control information detected through the SHCCH, and detects HSDPA packet data by demodulating the received HS-DSCH signal.

As stated above, in order to demodulate an HS-DSCH signal, the UE must read an SHCCH signal and detect corresponding control information from the SHCCH. That is, as illustrated in FIG. 1, the UE must receive the HS-DSCH signal after first receiving DPCH and SHCCH signals and reading control information from the received signals. That is, a start point of the downlink DPCH goes ahead of start points of the SHCCH and HS-DSCH. This is because before reading the HI and detecting the corresponding information, the UE cannot recognize whether the remaining two channels include data corresponding to the UE. That is, before reading the HI, the UE cannot recognize whether the received data corresponds to the UE, so the data should be temporarily stored in a buffer. Therefore, the UE receives the remaining two channels after allowing time to read the HI, thereby to reduce a load on the buffer. As a result, the UE determines whether there exists HSDPA packet data to receive by reading the HI part in the downlink DPCH, and reads HS-DSCH control information of the SHCCH if there exists HSDPA packet data to receive. Based on the control information, the UE receives the HSDPA packet data over the HS-DSCH.

Next, an uplink channel structure of a general HSDPA communication system will be described with reference to FIG. 2.

FIG. 2 schematically illustrates an uplink dedicated physical channel in a general HSDPA communication system. In the HSDPA communication system, UEs can assign all available OVSF (Orthogonal Variable Spreading Factor) codes for transmission of an uplink dedicated physical channel (DPCH), so channelization code resources are sufficient. If an uplink control channel's slot format of the non-HSDPA communication system, e.g., Release-99 communication system, is modified, a compatibility with the HSDPA communication system is not maintained and the uplink channel structure may be complicated. Therefore, an uplink control channel for the HSDPA communication system has been defined using a new channelization code. The uplink dedicated physical control channel (DPCCH) defined using a new channelization code can be used in both the HSDPA communication system and the non-HSDPA communication system. In this case, even when an HSDPA UE communicates with a Release-99 Node B, it is not necessary to modify the DPCCH slot format. Herein, DPCCH for the HSDPA communication system will be called "HS-DPCCH."

Referring to FIG. 2, the uplink DPCH includes the DPCH structure defined in the existing non-HSDPA communication system, e.g., Release-99 communication system. A description will be made of an uplink dedicated physical data channel (DPDCH) and an uplink DPCCH of the uplink DPCH. The DPDCH slots transmit upper layer data from a UE to a Node B. Each slot of the DPCCH includes Pilot field, TFCI (Transport Format Combination Indicator) field, FBI (FeedBack Information) field, and TPC (Transmit Power Control) field. The Pilot field transmits a pilot symbol, and the pilot symbol is used as a channel estimation signal when the UE modulates data to be transmitted to the Node B. The TFCI field transmits TFCI bits, and the TFCI bits indicate TFC (Transport Format Combination) used by the currently transmitted data. The FBI field transmits a feedback information symbol, and the feedback information symbol is transmitted when transmission diversity is used.

The TPC field transmits a TPC symbol, and the TPC symbol is used to control transmission power of a downlink channel. In addition, the uplink DPCCH is spread with an OVSF code before being transmitted, and a spreading factor (SF) currently used is fixed at 256.

In addition, control information that must be transmitted over an uplink in order to support the HSDPA, lies in the following two types of control information.

A first type of the control information consists in an ACK (Acknowledgement) signal or a NACK (Negative Acknowledgement) signal. In the HSDPA communication system, upon receiving data transmitted by a Node B, a UE checks whether the received data has an error, and transmits the ACK or NACK according to the error check result. In the SAW ARQ, the ACK or NACK can be expressed with 1 bit. Likewise, in the HSDPA where the n-channel SAW ARQ is used, the ACK or NACK is assigned only 1 bit.

A second type of the control information consists in a channel quality indicator (CQI).

Upon receiving a downlink channel signal, a UE measures a channel quality of the received downlink channel signal and reports the measured channel quality to a Node B. The Node B receives the channel quality information, determines an MCS level of HS-DSCH according to the channel quality, and generates TFRI, HS-DSCH control information. For example, as a result of analyzing the channel quality information reported by the UE, if the channel condition is good, the Node B selects a modulation technique of 16QAM (16-ary Quadrature Amplitude Modulation) which can increase a data rate at the sacrifice of a bit error rate (BER). In contrast, if the channel condition is poor, the Node B selects a modulation technique of QPSK (Quadrature Phase Shift Keying) having a lower BER.

The ACK/NACK and the CQI are transmitted over the HS-DPCCH. For example, in HS-DPCCH having a 3-slot TTI structure, one slot transmits the ACK/NACK and the remaining two slots transmit the CQI. Although the ACK/NACK is transmitted over a first slot of the TTI in FIG. 2, the slot transmitting the ACK/NACK can be changed. A spreading factor of a channelization code used for the HS-DPCCH in order to support the HSDPA is 256, like the spreading factor for the DPCCH in the Release-99 system. That is, the DPCCH uses a first OVSF code among OVSF codes with SF=256, whereas the HS-DPCCH uses a different OVSF code from the OVSF code used for the DPCCH. If the spreading factor of the HS-DPCCH is fixed at 256, the number of bits transmitted over one slot is fixed to 10. As a result, the number of ACK/NACK bits becomes 10, and the number of CQI bits becomes 20.

Next, a structure for transmitting the HS-DPCCH will be described with reference to FIG. 3.

FIG. 3 schematically illustrates a structure for transmitting an HS-DPCCH signal in a general HSDPA communication system. First, as described in conjunction with FIG. 2, in the HS-DPCCH structure, if a spreading factor is 256, ACK/NACK information is transmitted with 10 bits, and CQI information is transmitted with 20 bits. In addition, since the ACK/NACK information is expressed with 1 bit, a structure for repeating original information is necessary in order to transmit the ACK/NACK with 10 bits. Therefore, as illustrated in FIG. 3, a repeater 303 repeats 1-bit ACK/NACK 301 and outputs 10 bits. However, the CQI is transmitted with n bits. As stated above, since the CQI must be transmitted with 20 bits, the CQI should undergo channel coding in order to match the number of the CQI bits to 20. Therefore, as illustrated in FIG. 3, a channel coder 304 channel-codes n-bit CQI 302 at a preset coding rate, e.g., a coding rate of (20,n), and generates 20 coded bits. The generated 10-bit ACK/NACK and 20-bit CQI are inserted into corresponding slots according to a switching operation by a switch 307. When there is no ACK/NACK information or CQI information to be transmitted to the Node B, the UE performs a DTX operation.

Now, a method for generating CQI information by the UE according to the quality of a downlink channel signal will be described.

The CQI information is used by a Node B to determine an MCS level of HS-DSCH. The Node B uses a high data rate, or high MCS level, if a downlink channel has a good channel condition. Otherwise, if the downlink channel has a bad channel condition, the Node B uses a low data rate, or low MCS level. The Node B transmits the HS-DSCH in the determined MCS level. Commonly, the channel quality can be determined through a measured carrier-to-interference ratio (C/I) of a common pilot channel (CPICH). However, when the UE simply transmits only the channel condition to the Node B, condition variety of the UE is accommodated. That is, even though the channel condition is constant, the Node B may support a higher MCS level when the UE has higher performance. However, since the Node B cannot recognize performance of the UE, the Node B will determine an acceptable MCS level on the basis of a UE having normal performance. Therefore, it is preferable for the UE to generate CQI information taking its performance into consideration.

In addition, as stated above, a Node B determines an MCS level of HS-DSCH according to the CQI information received from a UE. If the Node B one-sidedly determines an MCS level for HS-DSCH, it is not possible to take the variety of performance of UEs into consideration. In order to determine an MCS level taking the variety of the UEs into consideration, the UEs must provide information on their performances so that the Node B can take performances of the UEs into consideration. That is, the UE checks a current channel condition by measuring C/I from CPICH, and defines the maximum acceptable transport format and TFRC (Transport Format and Resource Combination) as CQI information according to the checked channel condition, taking performance of the UE itself into consideration. The TFRC includes information on a modulation technique for HS-DSCH, a TBS (Transport Block Set) size, and the number of acceptable HS-DSCHs. Upon receiving the TFRC, for which performance of the UE was taken into consideration, from the UE, the Node B determines TFRI according to the received TFRC. The TFRI, as described in conjunction with FIG. 1, means an MCS level to be used in HS-DSCH, HS-DSCH channelization code information, and a transport format. That is, the TFRC is used by the UE to report a maximum acceptable limit to the Node B, and the Node B determines TFRI based on its capacity and the TFRC reported by the UE.

As described above, the UE determines TFRC after measuring C/I from CPICH, and examples of the TFRC that can be selected by the UE are illustrated in Table 1. Shown in Table 1 is a modulation technique for HS-DSCH, which can be accepted by the UE according to the channel condition, a TBS size, and the number of channels. For example, there may occur a case where the UE recognizes through C/I measurement that the channel condition is poor, and in addition, the UE has so low performance that it cannot process data having a high data rate. In this case, the UE selects TFRC1 and QPSK having a low BER, and sets a TBS size to 1200 to decrease a data rate, as illustrated in Table 1.

In other words, the UE will select TFRC1 on the assumption that in the current channel condition, if the UE selects TFRC2, it obtains a block error rate (BLER) higher than a BLER threshold, and if the UE selects TFRC1, it obtains BLER lower than the BLER threshold. The table shown in Table 1 must be included in both the UE and the Node B. The reason is because if the UE transmits TFRC1 to the Node B, the Node B can recognize a modulation technique and a TBS size, required by the UE, by searching Table 1 for the TFRC1.

TABLE 1

| TFRCs | Modulation | TBS Size | # of code channels |
|---|---|---|---|
| TFRC1 | QPSK | 1200 | 5 |
| TFRC2 | QPSK | 2400 | 5 |
| TFRC3 | QPSK | 3600 | 5 |
| TFRC4 | 16QAM | 4800 | 5 |
| TFRC5 | 16QAM | 6000 | 5 |
| TFRC6 | 16QAM | 7200 | 5 |

If the UE reports TFRC to the Node B instead of the measured C/I as shown in Table 1, the Node B may fail to correctly detect the channel condition. In other words, in the case where the UE reports the measured C/I to the Node B, since the C/I is a value showing the intact channel condition, the Node B can correctly detect the channel condition. However, since the TFRC is a value indicating a modulation technique and a TBS size, a variation in the TFRC will lead to a large variation in the C/I. That is, a C/I difference between the case where the UE selects TFRC1 and the case where the UE selects TFRC2 can be extended to several dB from 1 dB. Therefore, since a C/I difference between TFRC1 and TFRC2 can become several dB, it may be impossible for the Node B to recognize the correct channel condition.

Therefore, in order to correctly report the channel condition, the UE transmits HS-DSCH power offset to the Node B. The HS-DSCH power offset is an offset value against a reference power level of HS-DSCH. Upon receiving the HS-DSCH power offset, the Node B transmits an HS-DSCH signal at transmission power determined by increasing the reference HS-DSCH power by the HS-DSCH power offset. In this manner, the UE can correctly report the quality of a downlink channel using the HS-DSCH power offset. Table 2 below shows CQI information actually transmitted to the Node B by the UE. The UE generates the CQI information as a combination of the TFRC determined from Table 1 and the HS-DSCH power offset, taking into consideration the measured C/I and its performance. In Table 2, the number of cases that can be determined by the UE is 27, so the CQI information is expressed with 5 bits. Since TFRC and HS-DSCH power offset are used in Table 2, a C/I difference between uplink signaling values becomes small. That is, when more information bits are used, a C/I difference between uplink signaling values may become 1 dB, and when less information bits are used, the C/I difference between the uplink signaling values may become higher than 1 dB.

TABLE 2

| TFRC | Power offset | UL signaling value |
|---|---|---|
| TFRC1 | 12 dB | 0 |
| | 11 dB | 1 |
| | 10 dB | 2 |
| | 9 dB | 3 |
| | 8 dB | 4 |
| | 7 dB | 5 |
| | 6 dB | 6 |
| | 5 dB | 7 |
| | 4 dB | 8 |
| | 3 dB | 9 |
| | 2 dB | 10 |
| | 1 dB | 11 |
| | 0 dB | 12 |
| TFRC2 | 2 dB | 13 |
| | 1 dB | 14 |
| | 0 dB | 15 |
| TFRC3 | 2 dB | 16 |
| | 1 dB | 17 |
| | 0 dB | 18 |
| TFRC4 | 2 dB | 19 |
| | 1 dB | 20 |
| | 0 dB | 21 |
| TFRC5 | 2 dB | 22 |
| | 1 dB | 23 |
| | 0 dB | 24 |
| TFRC6 | 2 dB | 25 |
| | 1 dB | 26 |
| | 0 dB | 27 |

The UE periodically reports the determined CQI information of Table 2 to the Node B. However, when the UE is located in a soft handover (SHO) region, a condition of the downlink channel is poor, and in addition, a TPC command transmitted over an uplink DPCCH fails to correctly take a condition of the downlink channel into consideration. On the other hand, when the UE is not located in the SHO region, a condition of the downlink channel is better than when the UE is located in the SHO region, so the UE reports the CQI information at longer periods.

When the UE is located in the SHO region, an HS-DSCH signal is received from only one cell. However, unlike the HS-DSCH signal, downlink DPCH signals are received from a plurality of cells, i.e., the cells in the active set. Therefore, the UE soft-combines the downlink DPCH signals received from the cells, and then, measures a condition of the downlink DPCH. Based on the measured result, the UE transmits a TPC command for transmission power control on the downlink channel to the Node B. The TPC command includes information on transmission power for which the soft combining was taken into consideration. That is, the UE takes into consideration not only a condition of the HS-DSCH received from only one cell, but also a condition of the soft-combined downlink DPCH.

That is, the UE, when it is located in the SHO region, transmits CQI information to the Node B every TTI in order to correctly report a condition of the HS-DSCH. However, if all UEs located in the SHO region report the CQI information to the Node B every TTI, considerable uplink interference occurs. Further consideration should be taken into the fact that in an actual channel environment, an average channel condition is not abruptly changed every TTI. Accordingly, there have been demands for a method of correctly reporting the downlink channel quality while minimizing uplink interference.

SUMMARY OF THE INVENTION

It is, therefore, an object of the present invention to provide an apparatus and method for reporting downlink channel quality in an HSDPA communication system.

It is another object of the present invention to provide an apparatus and method for reporting downlink channel quality with minimized uplink interference in an HSDPA communication system.

To achieve the above and other objects, the present invention provides an apparatus for reporting downlink channel quality in a high-speed packet communication system. A channel analyzer measures downlink channel quality from a received reference channel signal. A controller determines whether a current TTI (Transmission Time Interval) is a TTI corresponding to a multiple of a first transmission period or a TTI corresponding to a multiple of a second transmission period. If the current TTI is a TTI corresponding to a multiple of the first transmission period, the controller determines CQ (Channel Quality) refreshment information for a downlink channel received from the Node B based on the measured downlink channel quality. If the current TTI is a TTI corresponding to a multiple of the second transmission period, the controller determines CQ refinement information for the downlink channel based on the measured downlink channel quality. A CQ information transmitter generates CQ refreshment information or CQ refinement information under the control of the controller, and transmits the generated CQ refreshment information or CQ refinement information over an uplink.

To achieve the above and other objects, the present invention provides a method for reporting downlink channel quality in a high-speed packet data communication system. The method comprises measuring downlink channel quality from a reference channel signal received from a Node B; after measuring the downlink channel quality, determining whether a current TTI (Transmission Time Interval) is a TTI corresponding to a multiple of a first transmission period or a TTI corresponding to a multiple of a second transmission period; if the current TTI is a TTI corresponding to a multiple of the first transmission period, determining CQ (Channel Quality) refreshment information for a downlink channel received from the Node B based on the measured downlink channel quality, and transmitting the determined CQ refreshment information to the Node B; and if the current TTI is a TTI corresponding to a multiple of the second transmission period, determining CQ refinement information for the downlink channel based on the measured downlink channel quality, and transmitting the determined CQ refinement information to the Node B.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, when a UE (User Equipment) is located in a soft handover (SHO) region, a downlink channel condition is poor, so the UE transmits CQI (Channel Quality Indicator) information every TTI (Transmission Time Interval). The reason for transmitting the CQI information every TTI is because a TPC (Transmit Power Control) command transmitted over an uplink DPCCH (Dedicated Physical Control Channel) cannot take into account a condition of the downlink channel. Therefore, the UE must frequently report the CQI information, information on the downlink channel condition, to a Node B. In addition, the UE may report the CQI information using a TFRC (Transport Format and Resource Combination) table including its maximum acceptable data rate and a modulation technique, taking into consideration its performance and a downlink channel condition. Alternatively, the UE may report a carrier-to-interference ratio (C/I) measured from a received common pilot channel (CPICH) signal to the Node B as the CQI information. Herein, the measured C/I will be referred to as "C/I measurement." That is, the UE, when it is located in the SHO region, must transmit the TFRC information or the C/I measurement to the Node B every TTI.

However, if all UEs located in the SHO region transmit the TFRC information and the C/I measurement to the Node B every TTI, the uplink interference will be increased. Therefore, the UE is required to report the TFRC information or the C/I measurement at periods little longer than TTI. In addition, the UE performs offset control, with relatively less bits, between time intervals for reporting the TFRC information or the C/I measurement. The offset control becomes an HS-DSCH (High Speed-Downlink Shared Channel) power offset for the TFRC, and a C/I offset for the C/I measurement. The offset control means controlling a power value to be increased or decreased against the TFRC previously reported to the Node B by the UE, or controlling a C/I value to be increased or decreased against the C/I measurement reported to the Node B by the UE.

Now, with reference to FIG. 4, a description will be made to a structure of an HS-DPCCH (High Speed-Dedicated Physical Control Channel) for reporting CQI for a downlink channel when the UE is located in the SHO region.

Figure 4:
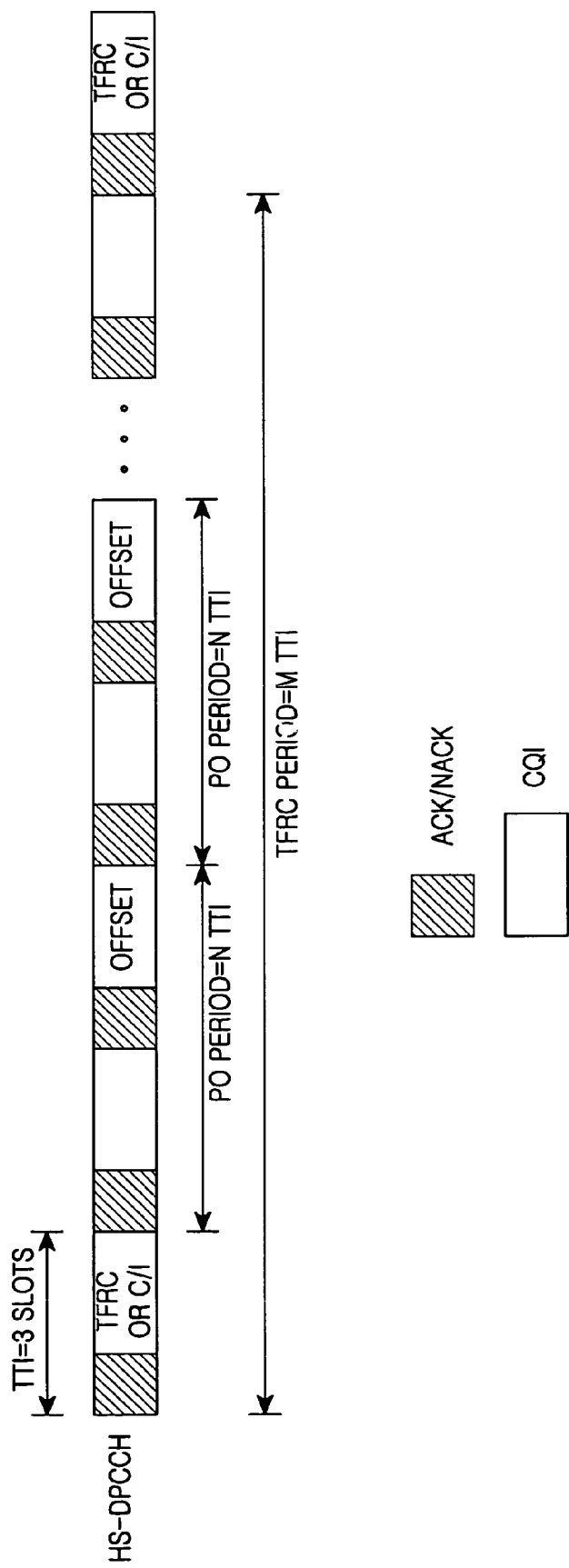
FIG. 4 illustrates a structure of an uplink HS-DPCCH according to an embodiment of the present invention.

FIG. 4 illustrates a structure of an uplink HS-DPCCH according to an embodiment of the present invention. If each TTI of the HS-DPCCH is comprised of 3 slots, one of the 3 slots transmits ACK (Acknowledgement) information or NACK (Negative Acknowledgement) information and the remaining two slots transmit CQI information. In the HS-DPCCH structure illustrated in FIG. 4, the ACK/NACK information is transmitted at the shaded parts and the CQI information is transmitted at the non-shaded parts. In addition, the TFRC information or the C/I measurement are transmitted at periods of M TTIs, and the offset information is transmitted at periods of N TTIs. Further, the CQI field is subject to DTX (Discontinuous Transmission), when it does not transmit the TFRC, the C/I measurement and the offset information.

Now, reference will be made to parameters that the UE should report to the Node B at periods of M TTIs, and parameters that the UE should report to the Node B at periods of N TTIs.

(1) Parameter to be reported at periods of M TTIs: C/I measurement; parameter to be reported at periods of N TTIs: C/I measurement offset (2) Parameter to be reported at periods of M TTIs: TFRC; parameter to be reported at periods of N TTIs: TFRC offset (3) Parameter to be reported at periods of M TTIs: TFRC; parameter to be reported at periods of N TTIs: HS-DSCH power offset First, a description will be made of a method for reporting a C/I measurement offset at periods of N TTIs in an M-TTI period, on the assumption that a parameter that the UE must transmit to the Node B at periods of M TTIs is an C/I measurement.

In the case of (1), it will be assumed that although the UE is located in the SHO region, the C/I measurement is not abruptly changed, so a C/I offset is reported instead. Commonly, the C/I measurement needs many information bits in order to provide a sufficient resolution. For example, when the C/I measurement is quantized into 128 segments, 7 information bits are needed. Now, the C/I measurement and the C/I measurement offset will be described with reference to FIG. 5.

Figure 1:
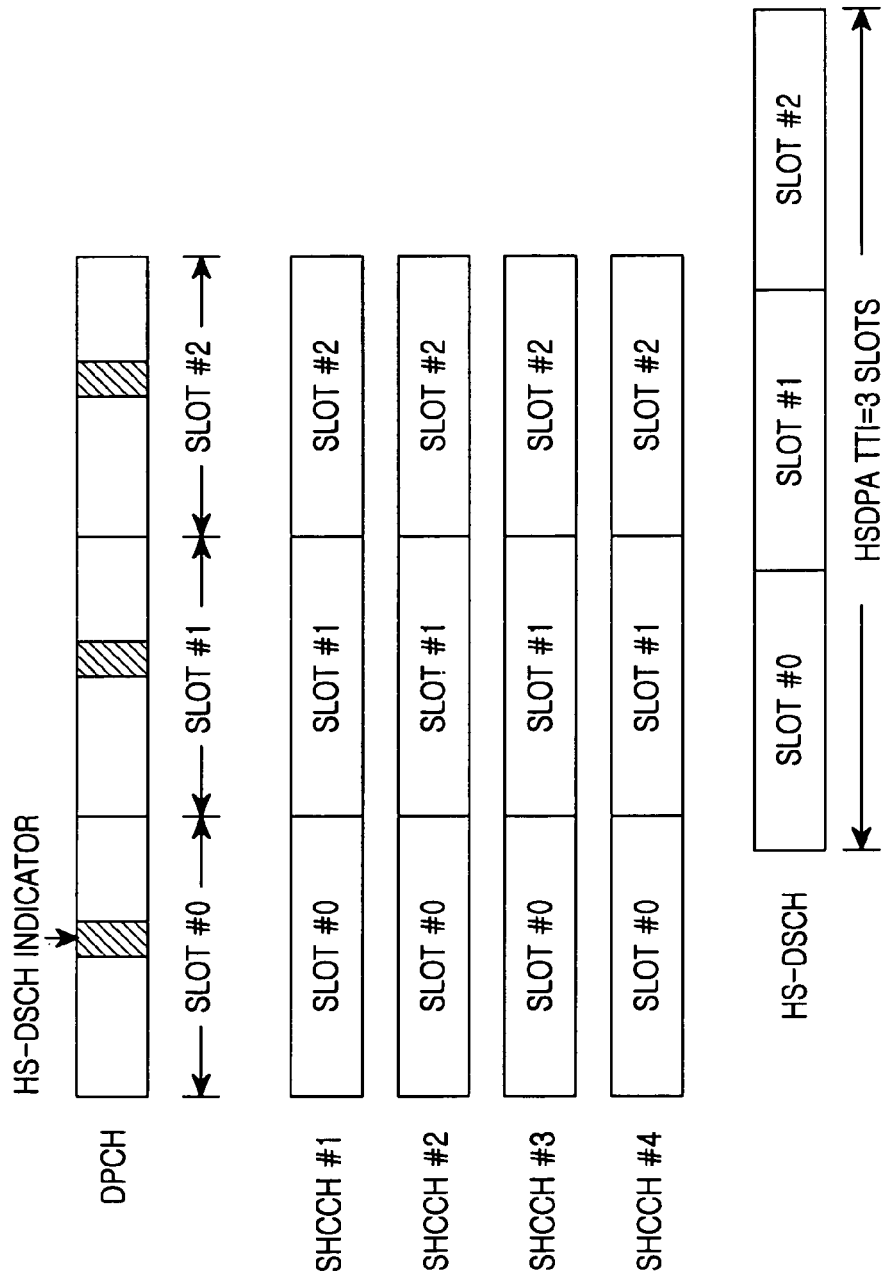
FIG. 1 schematically illustrates a downlink channel structure in a general HSDPA communication system.
Figure 2:
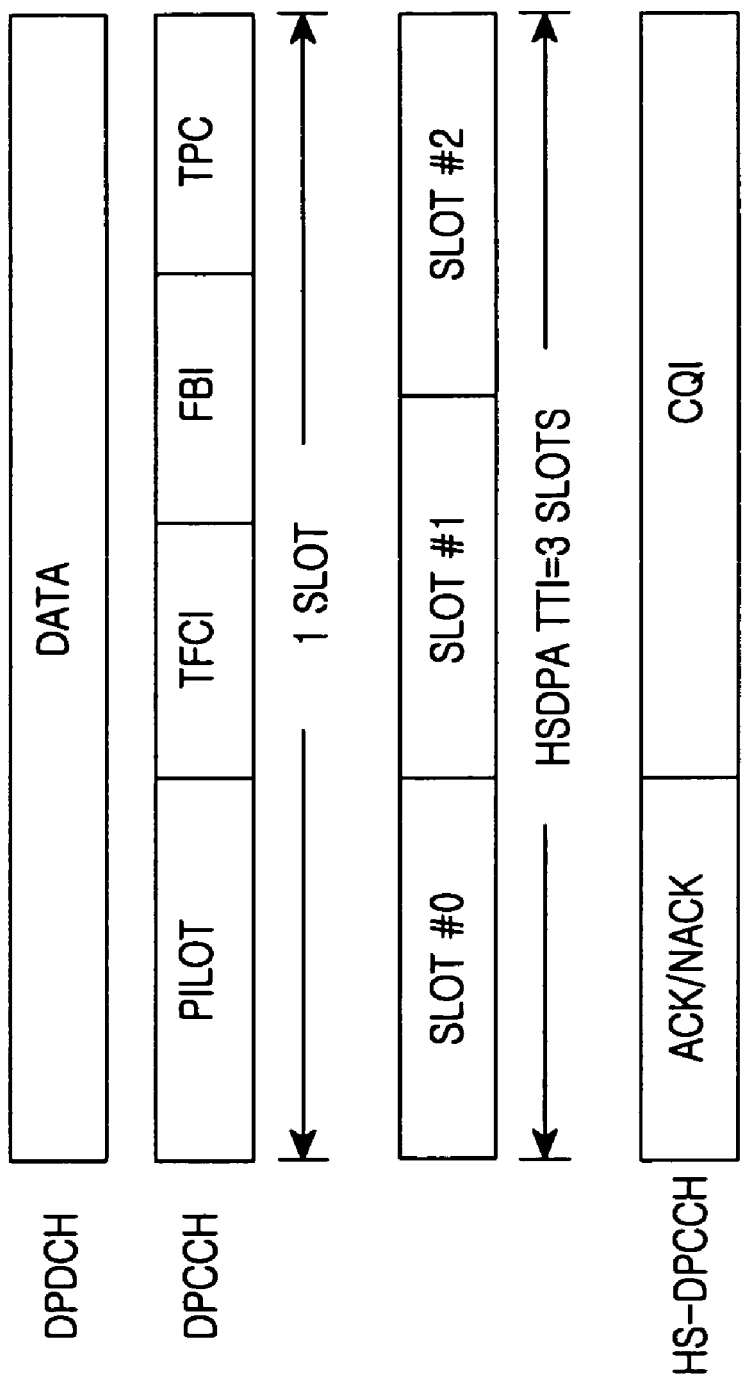
FIG. 2 schematically illustrates an uplink dedicated physical channel in a general HSDPA communication system.
Figure 3:
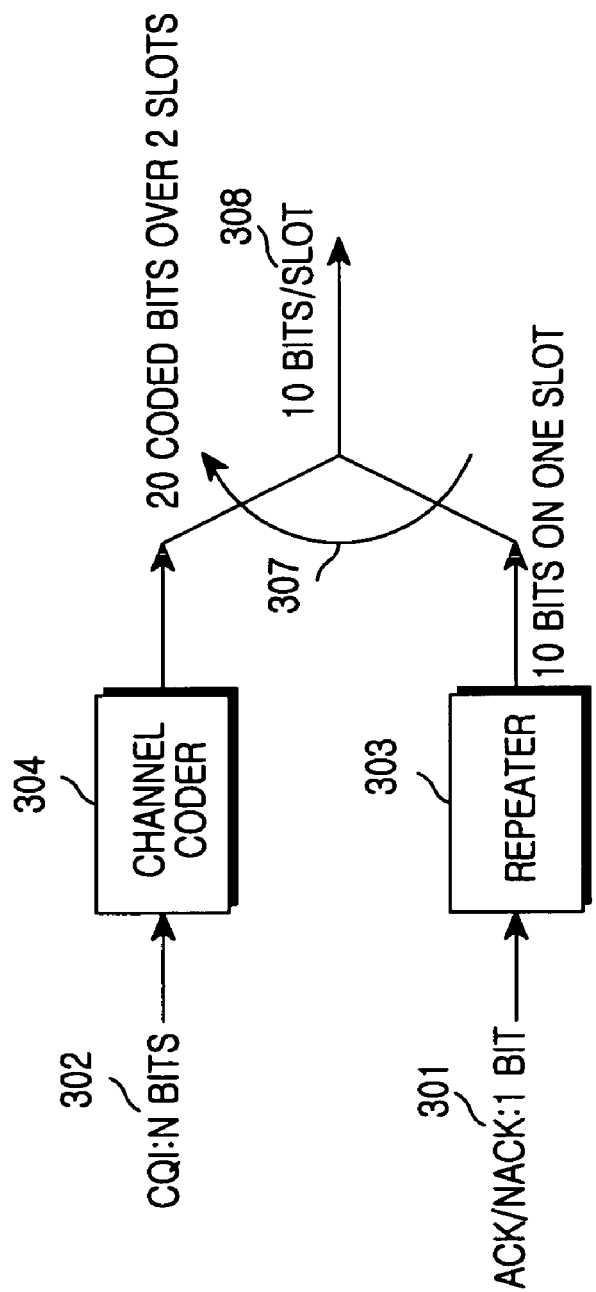
FIG. 3 schematically illustrates a structure for transmitting an HS-DPCCH signal in a general HSDPA communication system.
Figure 5:
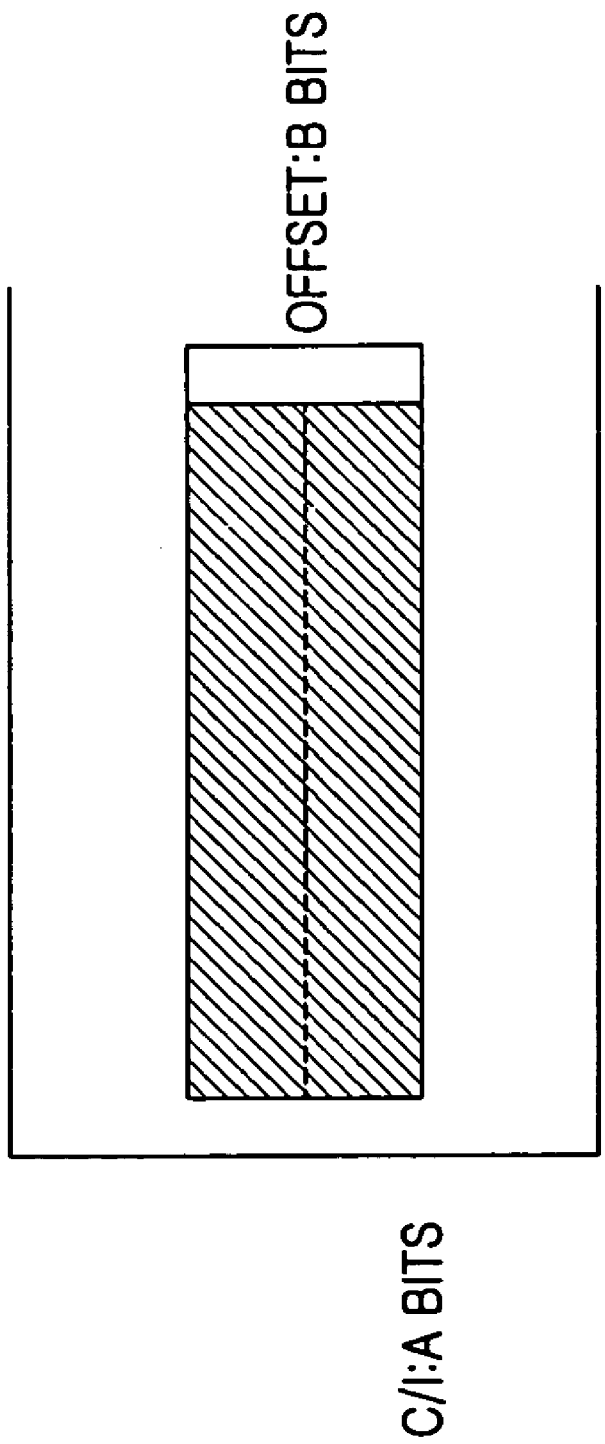
FIG. 5 illustrates a relationship between a C/I measurement and a C/I measurement offset.

FIG. 5 illustrates a relationship between a C/I measurement and a C/I measurement offset. Referring to FIG. 5, a C/I measurement previously transmitted by the UE has A bits, and the A bits are represented by a dotted line. On the basis of the dotted line representing the A bits, a B-bit C/I measurement offset is transmitted at periods of N TTIs in an M-TTI period according to a variation in a downlink channel condition. If the downlink channel condition remains unchanged, i.e., if the C/I measurement offset is 0, then the UE subjects a field for transmitting CQI information to a DTX operation. Since the UE reports the downlink channel quality with less information bits at periods of N TTIs, it needs less power as compared with when the UE reports the C/I measurement or TFRC every TTI. The reasons are as follows. As described in conjunction with FIG. 3, if the spreading factor is fixed to 256 and 3 slots constitute one TTI, then the CQI information is channel-coded with 20 bits. If the number of the CQI information bits is small, it is not possible to obtain a coding gain. As a result, an uplink interference generated when the UE reports the A-bit C/I measurement every TTI in the conventional method, is minimized by transmitting an A-bit C/I measurement at periods of M TTIs and transmitting a B-bit C/I measurement offset at periods of N TTIs according to the present invention.

In the case of (1), a description has been made of a method for reporting the C/I measurement at periods of M TTIs and the C/I measurement offset at periods of N TTIs in an M-TTI period, from the UE to the Node B.

Second, a description will be made of a method for reporting a TFRC offset at periods of N TTIs in an M-TTI period, on the assumption that a parameter that the UE must report to the Node B at periods of M TTIs is TFRC.

In the case of (2), the reason that when TFRC is reported at periods of M TTIs, a parameter that must be reported at periods of N TTIs is a TFRC offset is as follows. In Table 2, when the UE generates TFRC from the C/I measurement, a C/I measurement difference between signaling values may be 1 dB. In this case, since a TFRC reference table of Table 2 has enough accuracy, the UE transmits TFRC information at periods of M TTIs, and reports a TFCI offset at periods of N TTIs in the M-TTI period.

Now, a detailed description will be made of a method for reporting by the UE TFRC information at periods of M TTIs and a TFRC offset at periods of N TTIs in the M-TTI period. In Table 2, in the case where the UE first reports TFRC information with an uplink signaling value of 13 at periods of M TTIs, the number of transmission bits necessary for reporting the TFRC information becomes 5. Thereafter, the UE reports a variation in the downlink channel condition to the Node B at periods of N TTIs. At this moment, the UE reports specified upper/lower ranges on the basis of the uplink signaling value of 13. If the number of the specified upper/lower ranges on the basis of the uplink signaling value 13 is 8, the UE generates the TFRC offset at periods of N TTIs in a range between 4 upper signaling values 9 of the uplink signaling value 13 and 4 lower signaling values 17 of the uplink signaling value 13, and transmits the generated TFRC offset to the Node B. In this case, the number of information bits for the TFRC offset is 3. If the UE is required to change the uplink signaling value to 11 by measuring C/I at periods of N TTIs, the UE can set the TFRC offset to −2 before transmission. The Node B then can recognize that the uplink signaling value is changed to 11 since the previous uplink signaling value is 13 and the TFRC offset value is −2. Like the C/I measurement offset, if the TFRC offset is 0, the UE subjects the CQI field to a DTX operation.

In the case of (2), a description has been made of a method for reporting the TFRC information at periods of M TTIs and the TFRI offset at periods of N TTIs in an M-TTI period, from the UE to the Node B.

Third, a description will be made of a method for reporting an HS-DSCH power offset at periods of N TTIs in an M-TTI period, on the assumption that a parameter that the UE must report to the Node B at periods of M TTIs is TFRC information.

In the case of (3), the reason for reporting the HS-DSCH power offset is because due to a decrease in accuracy of the TFRC reference table shown in Table 1, a C/I measurement difference between uplink signaling values may be several dB. That is, since the TFRC information cannot correctly represent the downlink channel condition, i.e., since each TFRC may include a quite wide C/I measurement range, the UE transmits the HS-DSCH power offset. For example, a difference between the C/I measurement to be used by the UE to determine TFRC1 in Table 1 and the C/I measurement to be used to determine TFRC2 can be not 1 dB, but several dB. In order to compensate for the C/I measurement difference of several dB between TFRCs, the UE transmits HS-DSCH power offset in Table 2. However, the UE finely controls the power offset from 0 to 12 dB only for the TFRC1, but has a power offset of 0, 1 and 2 dB for the other TFRCs, making it difficult to correctly report the channel quality.

However, although the UE is located in the SHO region, an average downlink channel condition is not so abruptly changed that it changes an MCS (Modulation and Coding Scheme) level every TTI. That is, in the SHO region, the UE is not required to transmit TFRC information including the modulation technique and the TBS (Transport Block Set) size, every TTI. However, since channel fading occurs abruptly in the SHO region, the UE should allow the HS-DSCH to resist fading by controlling HS-DSCH power offset. Therefore, the UE transmits the HS-DSCH power offset at periods of N TTIs. That is, the UE reports the TFRC information at relatively longer periods of M TTIs, and transmits HS-DSCH power offset at relatively shorter periods of N TTIs in the M-TTI period. Although the embodiment transmits the HS-DSCH power offset, it is also possible to transmit a power offset determined by the uplink signaling value in Table 2, instead of transmitting the HS-DSCH power offset. A description will be made of a case where in Table 2, the uplink signaling value is 13, TFRC is TFRC2 and HS-DSCH power offset is 2 dB. First, it will be assumed that the UE transmits a power offset of 3 dB a predetermined time after it transmits the TFRC information for the uplink signaling value 13 to the Node B. The Node B then adds 3 dB to the power offset of 2 dB according to the uplink signaling value, and transmits an HS-DSCH signal at transmission power determined by adding 5 dB to the reference HS-DSCH power. In order to distinguish a power offset transmitted between TFRC reports from a power offset for the reference HS-DSCH power illustrated in Table 2, it will be defined as "PO." Here, the PO may become either an offset for the reference HS-DSCH power, or an offset for the power illustrated in Table 2.

That is, when the UE existing in the SHO region reports TFRC information at periods of M TTIs and PO at periods of N TTIs, the UE can increase accuracy of reporting the channel quality while decreasing uplink interference. Conventionally, as stated above, it was not possible to correctly take the downlink channel condition into consideration with only the TFRC of Table 2. However, by using the PO, it is possible to correctly take the downlink channel condition into consideration. For example, although the UE determines the TFRC2 and the power offset of 4 dB by measuring C/I from CPICH, Table 2 represents the TFRC2 and the power offset of up to 2 dB. Therefore, the UE should inevitably change a modulation technique and report TFRC1 to the Node B by the changed modulation technique. In this case, the UE can finely control transmission power by using the PO.

Further, in Table 2, 5 bits are needed to represent the TFRC information, but the PO can be represented with the smaller number of bits. Shown in Table 3 are the transmission bits for the PO. In Table 3, three transmission bits are used to represent the PO of −4~4 dB. If the PO is 0 dB, the UE is not required to transmit the PO to the Node B, so the UE performs a DTX operation on the corresponding transmission bits. Since the number of transmission bits for the PO is smaller than the number of transmission bits for the TFRC, the invention has an advantage in terms of the uplink transmission power. The reason is because, if the PO is channel-coded like the TFRC by the structure of FIG. 3, the PO has a higher coding gain than the TFRC, so the UE can transmit the HS-DSCH signal at lower transmission power.

TABLE 3

| PO [dB] | Transmission Bit |
|---------|------------------|
| −4      | 000              |
| −3      | 001              |
| −2      | 010              |
| −1      | 011              |
| 1       | 100              |
| 2       | 101              |
| 3       | 110              |
| 4       | 111              |

So far, the description has been made of the parameters that the UE in a SHO region must transmit to the Node B at periods of M TTIs, and the parameters that the UE in the SHO region must transmit to the Node B at periods of N TTIs. However, even when the UE is not located in the SHO region, the UE can report the parameters at periods of M TTIs and N TTIs. This will be described herein below.

Conventionally, the UE, when it is not located in the SHO region, reports TFRC or C/I measurement as CQI information at relatively longer periods. If a period of the TFRC report or C/I measurement report is long, there is a high probability that a channel condition will be changed in the period, so it is desirable to report the CQI information at shorter periods. Therefore, the UE, even though it is not located in the SHO region, can increase accuracy of the downlink channel quality in the same method as when the UE is located in the SHO region. It will be assumed that an existing period where the UE reports the CQI information is M TTIs. Since the M-TTI period is relatively longer period, the UE transmits offset information in order to increase accuracy of the downlink channel quality at periods of N TTIs in the M-TTI period. Here, M and N may have either the same values or different values as M and N used when the UE is located in the SHO region.

In the foregoing description, the UE transmits TFRC or C/I measurement at periods of M TTIs, and transmits their associated offsets at periods of N TTIs. However, the UE may transmit an up/down command to the Node B instead of the offset at periods of N TTIs. That is, the UE issues a command to increase or decrease TFRC, power or C/I measurement at periods of N TTIs on the basis of the TFRC or C/I measurement transmitted at relatively longer periods of M TTIs. Since the UE can transmit an up/down command with one transmission bit instead of the offset, it is possible to further reduce uplink transmission power.

In the embodiment of the present invention, the C/I measurement or TFRC information, i.e., CQI information transmitted by the UE at periods of M TTIs, will be referred to as "CQ refreshment information," and the offset information or up/down command transmitted by the UE at periods of N TTIs will be referred to as "CQ refinement information." First, if the CQ refreshment information is a C/I measurement, the CQ refinement information will become C/I measurement offset or up/down command. Second, if the CQ refreshment information is TFRC and Table 2 has sufficient accuracy, then the CQ refinement information will become a TFRC offset or up/down command. Third, if the CQ refreshment information is TFRC and Table 2 has insufficient accuracy, the CQ refinement information will become an HS-DSCH power offset or up/down command. This can be summarized as follows.

(1) CQ refreshment information: C/I measurement; CQ refinement information: C/I measurement offset or up/down command (2) CQ refreshment information: TFRC; CQ refinement information: TFRC offset or up/down command (3) CQ refreshment information: TFRC; CQ refinement information: HS-DSCH power offset or up/down command Meanwhile, in the invention, reference values of the offset or up/down command, i.e., CQ refinement information of each item, are as follows. A reference of the CQ refinement information can be a predetermined reference value, i.e., previous CQ refreshment information and previous CQ refinement information. As to the predetermined reference value, the UE determines an increase/decrease in the reference value by detecting a downlink channel condition, and determines an offset or up/down command. If the previous CQ refreshment information is used as a reference, the UE determines to increase or decrease previous CQ refreshment information based on a downlink channel condition and previous CQ refinement information. If the previous CQ refinement information is used as: a reference, the UE determines to increase or decrease previous CQ refinement information based on a downlink channel condition and previous CQ refinement information. If the three reference values are not changed while the offset or up/down command, i.e., the CQ refinement information is determined, the CQI field for transmitting the CQ refinement information undergoes a DTX operation. That is, if the channel environment is not changed, the UE is not required to report the CQI information to the Node B. Therefore, the UE subjects the CQI field to the DTX operation.

Next, a process of transmitting CQI information from a UE to a Node B will be described with reference to FIG. 6.

Figure 6:
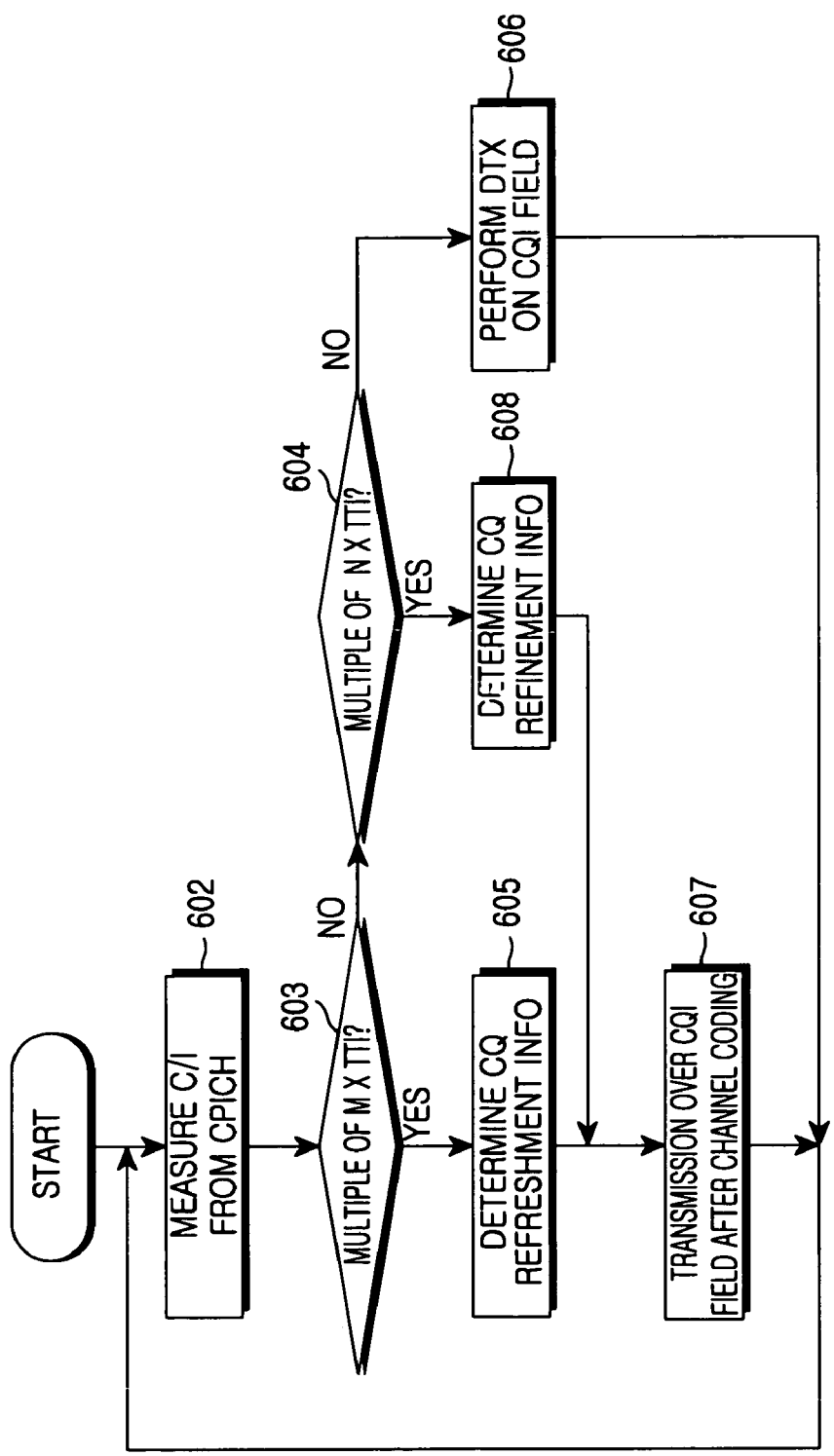
FIG. 6 illustrates a process of reporting CQI information by a UE according to an embodiment of the present invention.

FIG. 6 illustrates a process of reporting CQI information by a UE according to an embodiment of the present invention. Referring to FIG. 6, a UE measures C/I using a CPICH signal received from a Node B in step 602, and determines in step 603 whether a current TTI is a common multiple of M and TTI. As a result of the determination, if the current TTI is a common multiple of M and TTI, the UE recognizes that it must report the CQ refreshment information to the Node B, and proceeds to step 605. In step 605, the UE determines CQ refreshment information, and then proceeds to step 607. Here, a process of determining the CQ refreshment information will be described herein below. First, the UE determines TFRC from Table 1 and Table 2 using the measured C/I or a preset BLER (Block Error Rate) threshold. Here, if it is assumed that when TFRC3 is selected from the current C/I based on Table 1 only, a BLER higher than the BLER threshold is selected, and when TFRC2 is selected, a BLER lower than the BLER threshold is selected, then the UE selects TFRC2. In order to correctly report the channel quality, the UE uses Table 2. If it is determined that the UE can obtain a BLER lower than the BLER threshold by selecting TFRC3 and setting HS-DSCH power offset to 2 dB, the UE will select an uplink signaling value of 16. After determining the CQ refreshment information as C/I measurement or TFRC, the UE channel-codes, in step 607, the determined CQ refreshment information, and transmits the channel-coded CQ, refreshment information over a CQI field of HS-DPCCH, and then returns to step 602.

However, if it is determined in step 603 that the current TTI is not a common multiple of M and TTI, the UE proceeds to step 604. In step 604, the UE determines whether the current TTI is a common multiple of N and TTI. As a result of the determination, if the current TTI is a common multiple of N and TTI, the UE proceeds to step 608. In step 608, the UE determines CQ refinement information corresponding to the CQ refreshment information transmitted at periods of the common multiple of M and TTI, and then proceeds to step 607. A process of determining the CQ refinement information will be described herein below. If the CQ refreshment information is a C/I measurement, CQ refinement information is determined as a C/I offset or an up/down command. If the CQ refreshment information is TFRC information, CQ refinement information is determined as a TFRC offset, or an up/down command and a power offset, or an up/down command. In step 607, the UE channel-codes the CQ refinement information, and transmits the channel-coded CQ refinement information over the CQI field of HS-DPCCH, and then returns to step 602. In step 607, a channel coding method for the CQ refreshment information is different from a channel coding method for the CQ refinement information. The reason is because the number of bits for transmitting the CQ refreshment information is different from the number of bits for transmitting the CQ refinement information. Finally, if it is determined in step 604 that the current TTI is not a common multiple of N and TTI, the UE proceeds to step 606 since the UE is not required to report the downlink channel condition. In step 606, the UE subjects the CQI field to DTX, and then returns to step 602.

Next, a process of transmitting a downlink channel signal by a Node B according to the CQI information received from the UE will be described with reference to FIG. 7.

Figure 7:
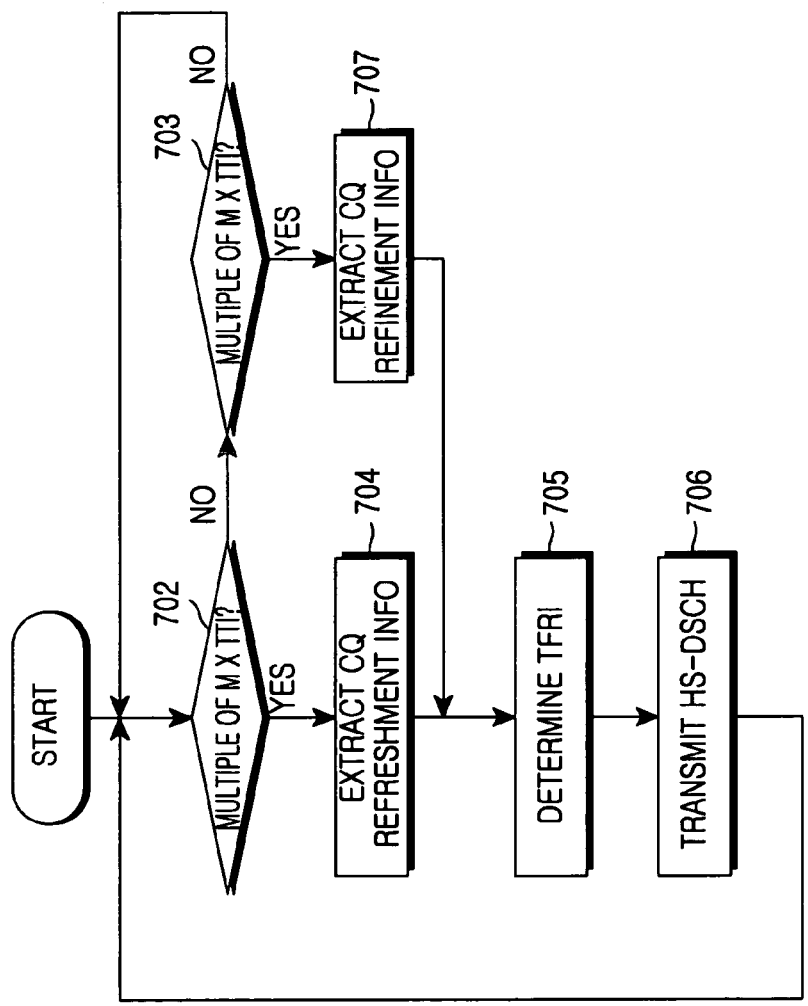
FIG. 7 is a flow chart illustrating a process of transmitting a downlink channel signal by a Node B based on received CQI information according to an embodiment of the present invention.

FIG. 7 is a flow chart illustrating a process of transmitting a downlink channel signal by a Node B based on received CQI information according to an embodiment of the present invention. Referring to FIG. 7, a Node B determines in step 702 whether a current TTI is a common multiple of M and TTI. If it is determined in step 702 that the current TTI is a common multiple of M and TTI, the Node B recognizes that CQ refreshment information has been transmitted over a CQI field of HS-DPCCH, and proceeds to step 704 where the Node B extracts the CQ refreshment information through demodulation and decoding. Here, if the extracted CQ refreshment information is a C/I measurement, the Node B determines TFRI of HS-DSCH according to the downlink channel condition in step 705. If the extracted CQ refreshment information is TFRC information, the Node B determines, in step 705, TFRC by checking whether the UE can accept the requested TFRI, and then proceeds to step 706. Here, the TFRI represents an MCS level and a transport format for HS-DSCH by the Node B. If the Node B can accept the TFRC received as the CQI information in step 705, the Node B reflects the intact TFRC in the TFRI. However, if the Node B cannot accept the received TFRC, the Node B generates TFRI by modifying the received TFRC. In step 706, the Node B transmits an HS-DSCH signal according to the TFRI determined in step 705, and then returns to step 702.

However, if it is determined in step 702 that the current TTI is not a common multiple of M and TTI, the Node B determines in step 703 whether the current TTI is a common multiple of N and TTI. As a result of the determination, if the current TTI is a common multiple of N and TTI, the Node B recognizes that CQ refinement information has been transmitted over the CQI field of HS-DPCCH, and proceeds to step 707. In step 707, the Node B extracts CQ refinement information through demodulation and decoding. Thereafter, in step 705, the Node B determines TFRI using the CQ refinement information extracted in step 704. Otherwise, if it is determined in step 703 that the current TTI is not a common multiple of N and TTI, the Node B returns to step 702 without performing demodulation and decoding on the CQI field since the UE did not report the quality of the downlink channel to the Node B.

The invention has been described above with reference to an example where the UE transmits CQ refinement information and CQ refinement information at periods of the common multiple of M and TTIs and the common multiple of N and TTIs, respectively. However, in an alternative embodiment, a method of reporting the CQ refinement information to the Node B at periods of the common multiple of M and TTIs and reporting the CQ refinement information to the Node B only at a time when the UE needs to transmit the CQ refinement information, will be described with reference to FIG. 11.

Figure 11:
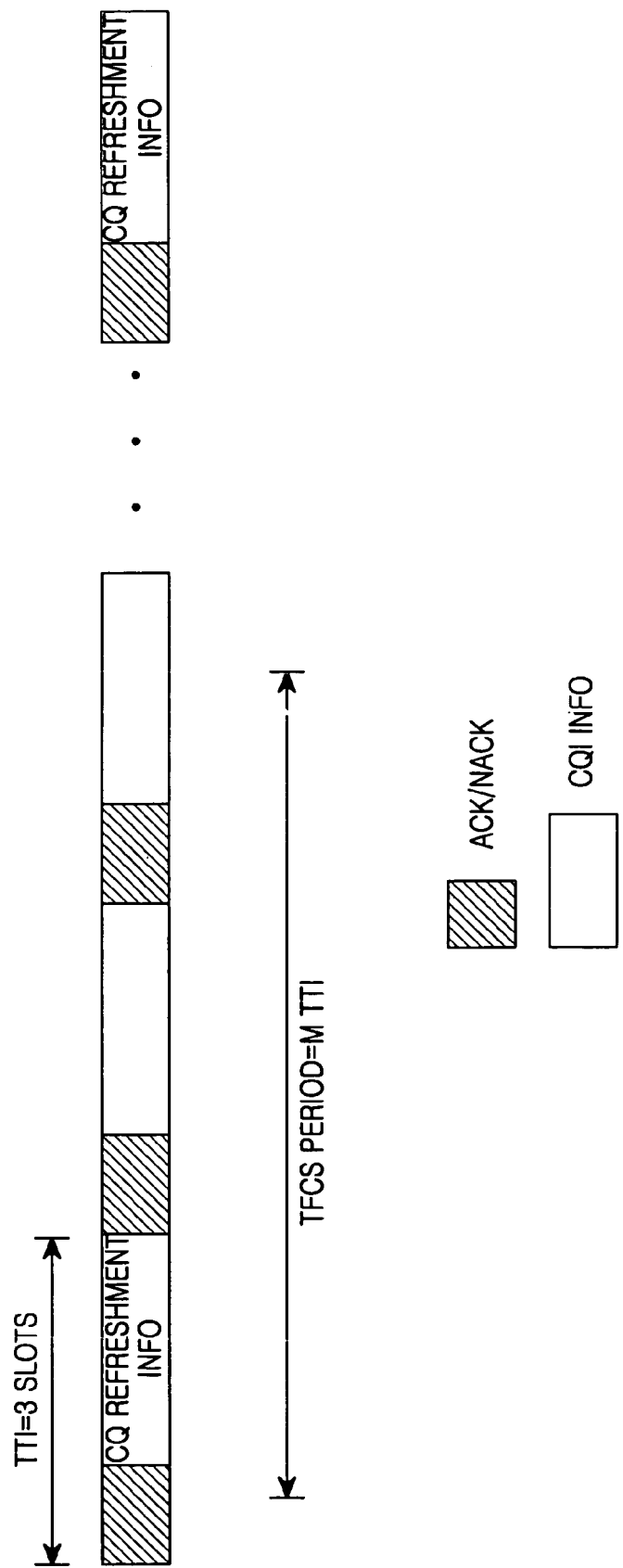
FIG. 11 illustrates a format of an uplink HS-DPCCH according to an embodiment of the present invention.

FIG. 11 illustrates a format of an uplink HS-DPCCH according to an embodiment of the present invention. Referring to FIG. 11, as stated above, ACK/NACK information is transmitted over one slot in TTI of the HS-DPCCH, and CQI information is transmitted over the remaining two slots. In FIG. 11, a shaded part represents the slot for transmitting the ACK/NACK information, and a non-shaded part represents the slots for transmitting the CQI information. Alternatively, the CQ refinement information is transmitted at periods of the common multiple of M and TTIs, and the CQ refinement information is transmitted at any time point where the CQ refinement information is not transmitted. However, the CQ refinement information is transmitted by the UE only when the downlink channel condition becomes poor, for example, when the currently measured C/I measurement and the previously measured C/I measurement are larger than a preset threshold. Therefore, when the CQ refinement information is transmitted at periods of the common multiple of M and TTI and the channel condition becomes poor in the common multiple of M and TTI period, i.e., only when a C/I measurement difference is larger than a threshold, the CQ refinement information is transmitted thus to improve accuracy of the downlink channel quality.

Next, a process of determining by the UE whether to transmit CQ refinement information by detecting a downlink channel condition using a C/I measurement during transmission of CQ refreshment information at periods of the common multiple of M and TTI, will be described with reference to FIG. 12.

Figure 12:
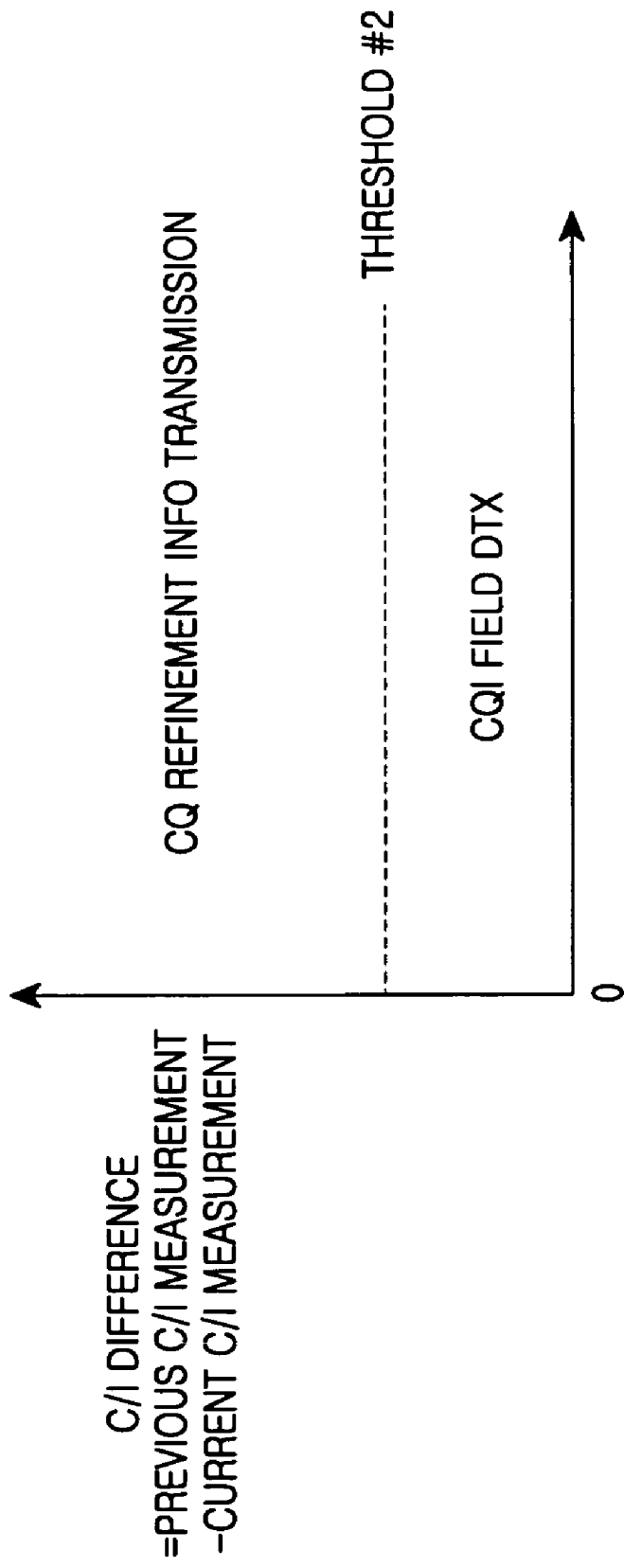
FIG. 12 illustrates a method of determining by a UE whether to transmit CQ refinement information according to an embodiment of the present invention.

FIG. 12 illustrates a method of determining by a UE whether to transmit CQ refinement information according to an embodiment of the present invention. Referring to FIG. 12, if a difference between a previous C/I measurement and a current C/I measurement measured by the UE from a CPICH signal received during a period of the common multiple of M and TTI is larger than or equal to a preset threshold, e.g., threshold #2, then the UE recognizes that the downlink channel condition is poor. The UE then generates a C/I offset (or up/down command), a TFRC offset (or up/down command) and a power offset (or up/down command), i.e., CQ refinement information, from the previous C/I measurement or TFRC, and transmits the generated parameters over a CQI field of HS-DPCCH at the next TTI. If the C/I difference measured during transmission of the CQ refinement information at periods of the common multiple of M and TTI is smaller than the threshold #2, the UE recognizes that the downlink channel condition is acceptable. In this case, since the UE is not required to transmit CQ refinement information, the UE subjects the CQI field of HS-DPCCH to DTX.

Next, a process of transmitting CQI information from a UE to a Node B according to an embodiment of the present invention will be described with reference to FIG. 13.

Figure 13:
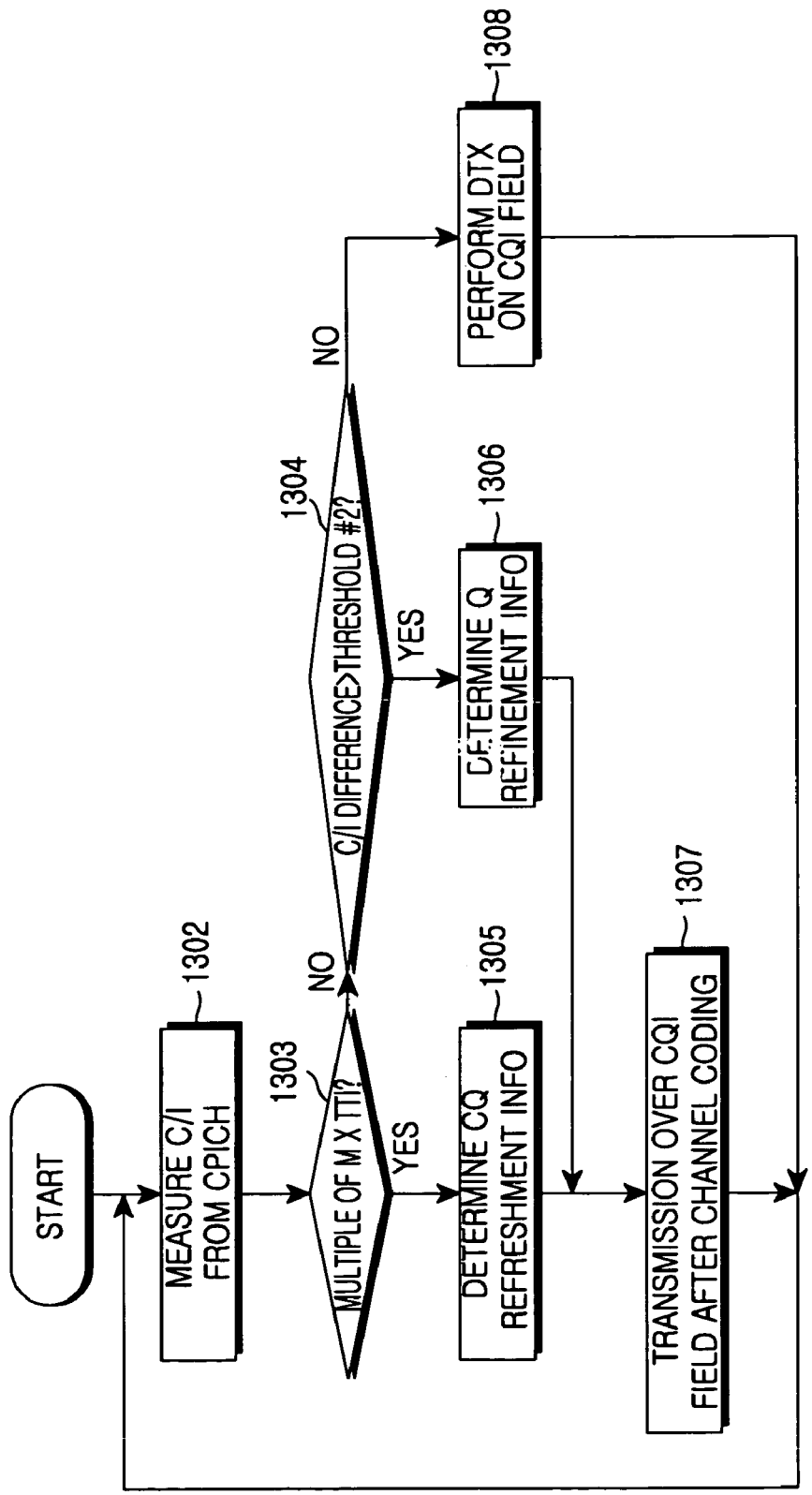
FIG. 13 is a flow chart illustrating a process of reporting CQI information by a UE according to an embodiment of the present invention.

FIG. 13 is a flow chart illustrating a process of reporting CQI information by a UE according to an embodiment of the present invention. Referring to FIG. 13, the UE measures a C/I using a received CPICH signal in step 1302, and determines in step 1303 whether a current TTI is a common multiple of M and TTI. As a result of the determination, if the current TTI is a common multiple of M and TTI, the UE proceeds to step 1305. In step 1305, the UE determines TFRC from Table 1 and Table 2 using the measured C/I measurement or a BLER threshold, and then proceeds to step 1307. In step 1307, the UE channel-codes the determined CQ refinement information and transmits the channel-coded CQ refinement information over a CQI field of HS-DPCCH, and then returns to step 1302. However, if it is determined in step 1303 that the current TTI is not the common multiple of M and TTI, the UE determines in step 1304 whether the measured C/I difference is larger than or equal to a preset threshold, e.g., threshold #2. As a result of the determination, if the measured C/I difference is larger than or equal to the threshold #2, the UE determines CQ refinement information in step 1306, and then proceeds to step 1307 for transmission at the next TTI. In step 1307, a process of channel-coding the CQ refinement information is different from a process of channel-coding the CQ refreshment information. This is because the number of information bits for transmitting the CQ refinement information is different from the number of information bits for transmitting the CQ refreshment information. If it is determined in step 1304 that the C/I difference is smaller than the threshold #2, the UE subjects the CQI field to DTX since the downlink channel quality is high, and thereafter, returns to step 1302.

Next, a process of transmitting a downlink channel signal by a Node B based on CQI information received from a UE according to an embodiment of the present invention will be described with reference to FIG. 14.

Figure 14:
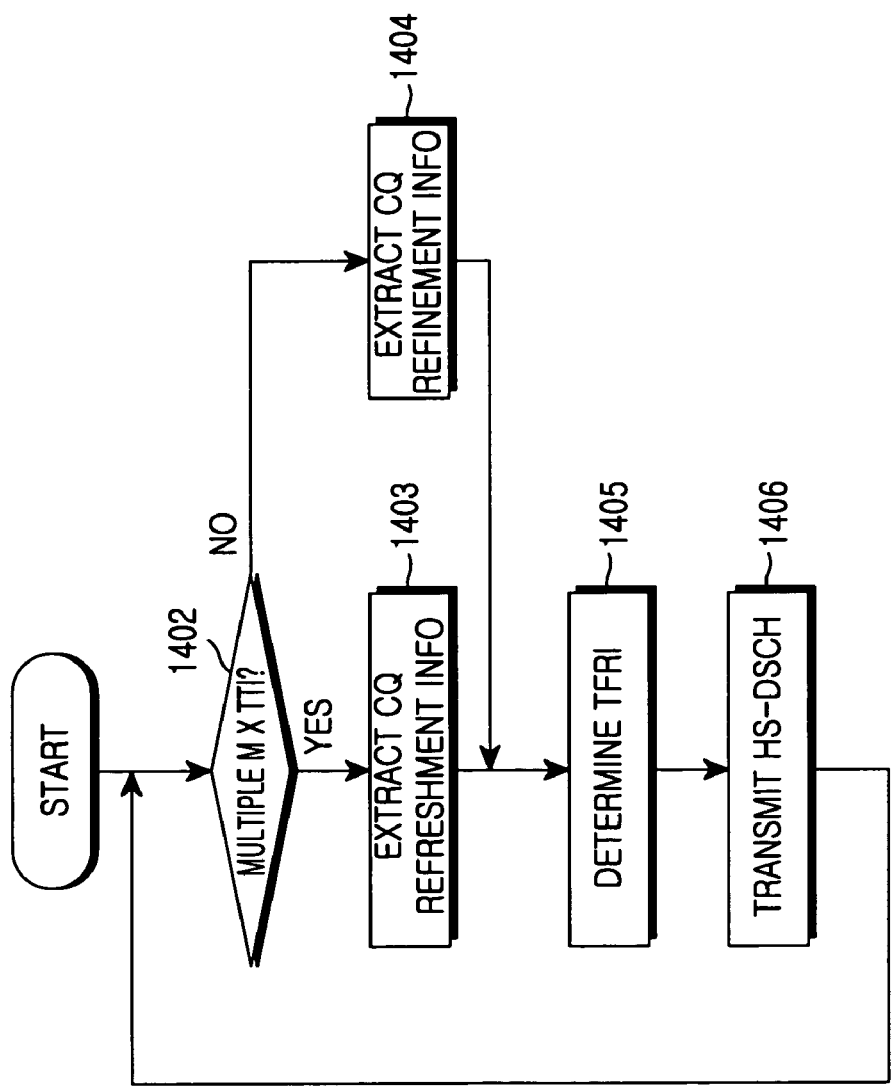
FIG. 14 is a flow chart illustrating a process of transmitting by a Node B a downlink channel signal based on received CQI information according to an embodiment of the present invention.

FIG. 14 is a flow chart illustrating a process of transmitting by a Node B a downlink channel signal based on received CQI information according to an. embodiment of the present invention. Referring to FIG. 14, a Node B determines in step 1402 whether a current TTI is a common multiple of M and TTI. If the current TTI is a common multiple of M and TTI, the Node B recognizes that CQ refreshment information has been transmitted over a CQI field of HS-DPCCH, and proceeds to step 1403. In step 1403, the Node B extracts the CQ refreshment information through demodulation and decoding, and then proceeds to step 1405. Here, if the extracted CQ refreshment information is a C/I measurement, the Node B determines in step 1405 TFRI of HS-DSCH according to the quality of a downlink channel, and then proceeds to step 1406. If the extracted CQ refreshment information is TFRC information, the Node B determines in step 1405 whether it can accept TFRC requested by the UE and determines TFRI according to the determined result, and then proceeds to step 1406. Here, the TFRI represents an MCS level and a transport format for HS-DSCH by the Node B, and if the Node B can accept the received TFRC, the Node B reflects the intact TFRC in the TFRI. However, if the Node B cannot accept the received TFRC, the Node B generates TFRI by modifying the received TFRC so that it can be accepted by the Node B, and then proceeds to step 1406. In step 1406, the Node B transmits an HS-DSCH signal according to the TFRI determined in step 1405, and then returns to step 1402. However, if it is determined in step 1402 that the current TTI is not a common multiple of M and TTI, the Node B extracts, in step 1404, CQ refinement information by demodulating and channel-decoding a CQI field every TTI, since CQ refreshment information may be received. Thereafter, the Node B proceeds to step 1405. Since a method of determining TFRI using the extracted CQ refinement information has been described above, a detailed description of the method will not be provided.

Next, a structure of a UE receiver according to an embodiment of the present invention will be described with reference to FIG. 8.

Figure 8:
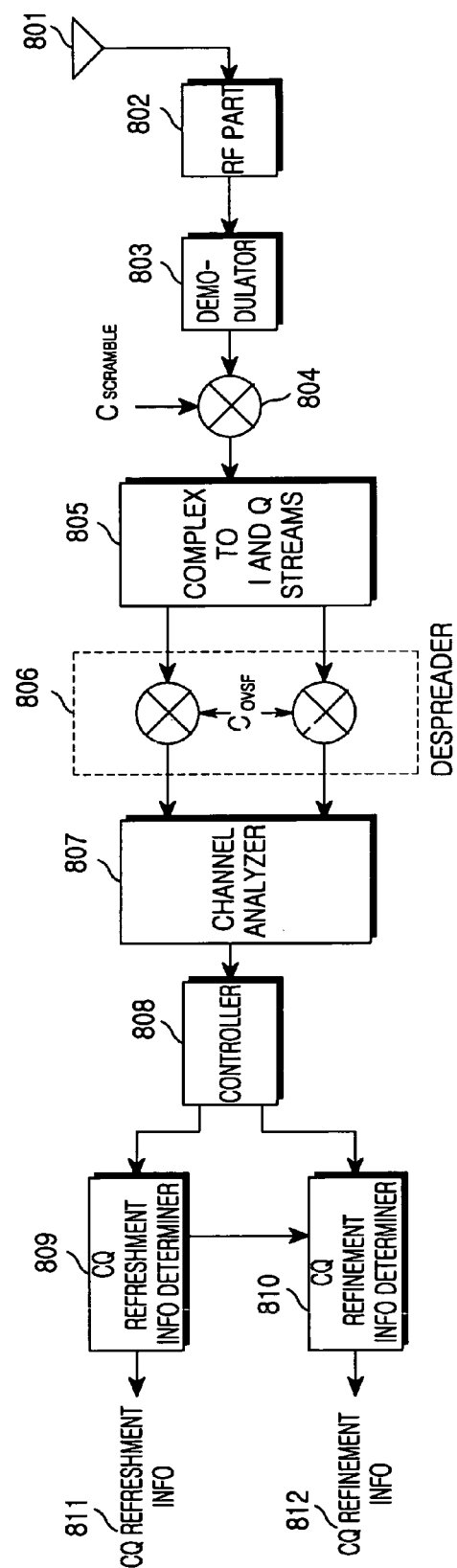
FIG. 8 is a block diagram illustrating an internal structure of a UE receiver according to an embodiment of the present invention.

FIG. 8 is a block diagram illustrating an internal structure of a UE receiver according to an embodiment of the present invention. Although a UE has a structure for receiving all downlink channels such as CPICH, DPCH, HS-DSCH and SHCCH, the structure of FIG. 8 receives only the CPICH signal, for convenience of explanation.

Referring to FIG. 8, an RF (Radio Frequency) signal received through an antenna 801 is converted to a baseband signal by an RF part 802, demodulated by a demodulator 803, and then provided to a descrambler 804. The descrambler 804 multiplies an output signal of the demodulator 803 by the same scrambling code $C_{SCRAMBLE}$ as a scrambling code used by a Node B, and provides its output to a signal separator (or complex to I and Q streams) 805. The signal separator 805 separates (or demultiplexes) a complex signal output from the descrambler 804 into a real signal I and an imaginary signal Q, and provides the separated signals to a despreader 806. The despreader 806 multiplies the signals I and Q output from the signal separator 805 by the same channelization code $C_{OVSF}$ as a channelization code used by the Node B, for despreading, and provides the despread signals to a channel analyzer 807. The channel analyzer 807 analyzes a channel condition by receiving an output signal of the despreader 806. In the embodiment of the present invention, the channel analyzer 807 analyzes a channel condition based on a measured C/I of CPICH, for channel analysis, and provides a C/I measurement. Of course, the channel analyzer 807 may analyze a downlink channel condition based on the other parameters instead of the C/I measurement of CPICH.

The C/I measurement output from the channel analyzer 807 is provided to a controller 808, and the controller 808 controls generation of CQI information based on the C/I measurement. The controller 808 must generate CQ refreshment information, when a current TTI is a common multiple of M and TTI. In that case, the controller 808 provides the output of the channel analyzer 807 to a CQ refreshment information determiner 809. In the first method stated above, CQ refinement information must be generated, if the current TTI is a common, multiple of N and TTI. Therefore, the controller 808 provides the output of the channel analyzer 807 to a CQ refinement information determiner 810. However, in the second method, when a C/I difference is larger than a preset threshold, for example, a threshold #2, i.e., only when the channel condition is poor, the controller 808 generates the CQ refinement information. Therefore, the controller 808 provides the output of the channel analyzer 807 to the CQ refinement information determiner 810, only when the C/I difference is larger than the threshold #2. The CQ refreshment information determiner 809 determines the channel quality report as a C/I measurement or TFRC, and provides its output as CQ refreshment information 811. Further, the C/I measurement or TFRC from the CQ refreshment information determiner 809 is provided to the CQ refinement information determiner 810. The CQ refinement information determiner 810 generates an offset or up/down command for the TFRC or C/I measurement determined by the CQ refreshment information determiner 809. As a result, the CQ refinement information determiner 810 determines an offset or up/down command using the C/I measurement on the basis of C/I or TFRC received from the CQ refreshment information determiner 809, and provides its output as CQ refinement information 812.

Next, a structure of UE transmitter according to an embodiment of the present invention will be described with reference to FIG. 9.

Figure 9:
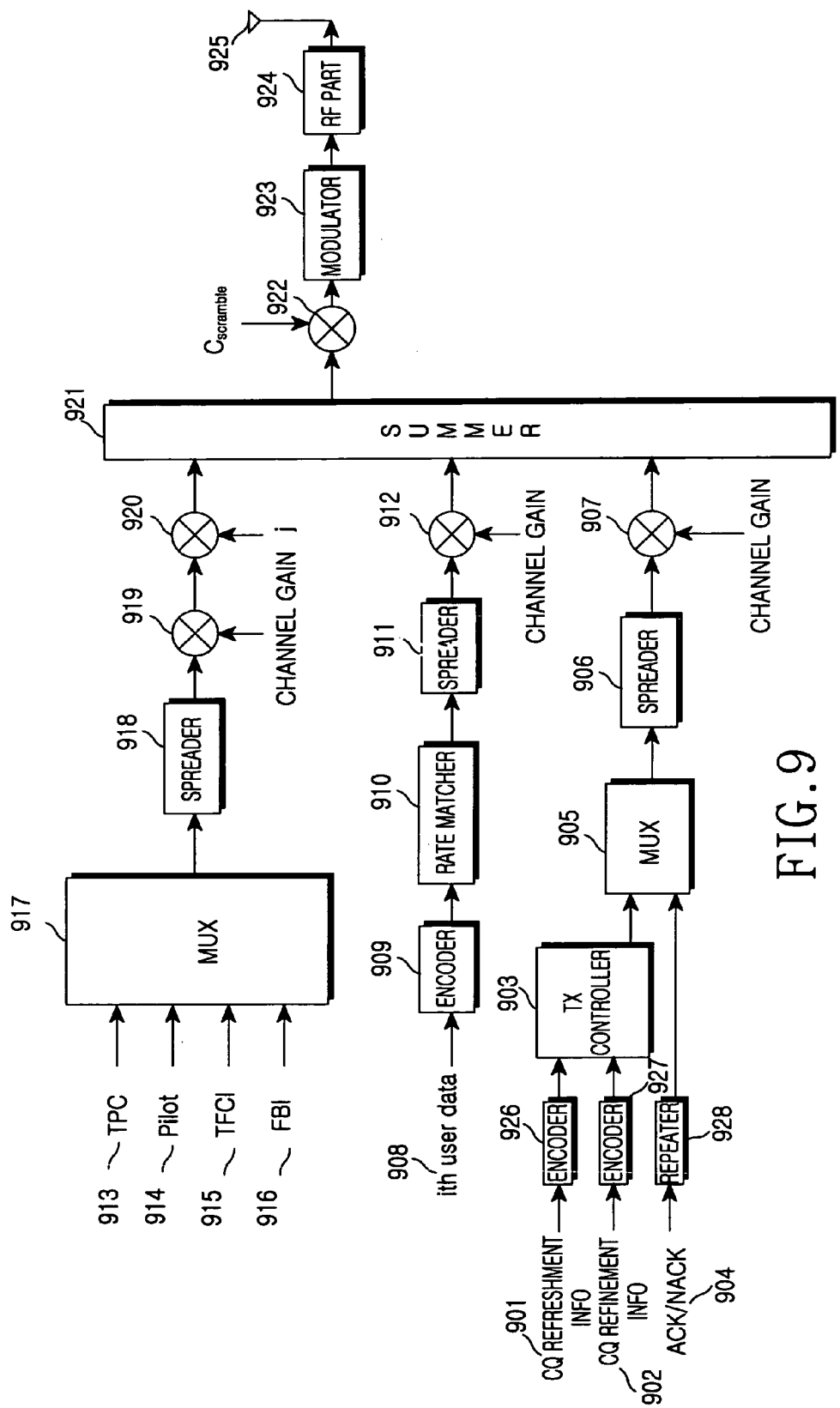
FIG. 9 is a block diagram illustrating an internal structure of a UE transmitter according to an embodiment of the present invention.

FIG. 9 is a block diagram illustrating an internal structure of a UE transmitter according to an embodiment of the present invention. Referring to FIG. 9, CQ refreshment information 901 and CQ refinement information 902, determined as described in conjunction with FIG. 8, are encoded by an encoder 926 and 927, respectively, and then provided to a transmission controller 903. The encoders 926 and 927 channel-code the CQ refreshment information 901 and the CQ refinement information 902 into 20 bits, respectively. Here, the reason for channel-coding the CQ refreshment information 901 and the CQ refinement information 902 into 20 bits is because if a spreading factor is 256, the CQI information is transmitted over two slots of HS-DPCCH. Transmission points of the signals output from the encoder 926 and 927 are determined by the transmission controller 903. If the current TTI is a common multiple of M and TTI, the transmission controller 903 provides the output of the encoder 926 to a multiplexer 905. In the first channel quality reporting method, if the current TTI is a common multiple of N and TTI, CQ refinement information must be transmitted. Therefore, the transmission controller 903 provides the output of the encoder 927 to the multiplexer 905. However, in the second channel quality reporting method, if a C/I difference is larger than a threshold #2, i.e., only if the channel quality is poor, the transmission controller 903 transmits the CQ refinement information at the next TTI. Therefore, the transmission controller 903 provides the output of the encoder 927 to the multiplexer 905, only if the C/I difference is larger than the threshold #2. In addition, ACK/NACK 904 is repeated into 10 bits by a repeater 928. Here, the reason for repeating ACK/NACK 904 into 10 bits is also because if the spreading factor is 256, the ACK/NACK 904 is transmitted over one slot of the HS-DPCCH.

The output of the transmission controller 903 and the output of the repeater 928, after transmission points of which are determined by the multiplexer 905, are spread with a spreading code for HS-DPCCH by a spreader 906, and then multiplied by a channel gain by a multiplier 907. An output signal of the multiplier 907 is provided to a summer 921 where the provided signal is summed with DPDCH and DPCCH.

Meanwhile, user data 908 (or signaling information from an upper layer) is channel-coded with a convolutional code or turbo code by an encoder 909, and provided to a rate matcher 910. The rate matcher 910 performs puncturing or repetition and interleaving on the channel coded data from the encoder 909 so that the channel coded data is suitable to a DPDCH slot format. The output data of the rate matcher 910 is provided to a spreader 911, where it is multiplied by a channelization code used for spreading DPDCH. The user data spread by the spreader 911 is multiplied by a channel gain by a multiplier 912, and then provided to the summer 921, where it is summed with DPCCH. In addition, TPC (Transmit Power Control) 913, Pilot 914, TFCI (Transport Format Combination Indicator) 915, and FBI (FeedBack Information) 916 are multiplexed by a multiplexer 917 to construct DPCCH. The DPCCH multiplexed by the multiplexer 917 is spread with a channelization code for DPCCH by a spreader 918, and then multiplied by a channel gain for controlling transmission power of DPCCH by a multiplier 919. An output signal of the multiplier 919 is multiplied by a complex number j by a multiplier 920. Here, the reason for multiplying the DPCCH by the complex number j by the multiplier 920 is because as the DPCCH multiplied by the complex number j and the DPDCH are separated into a real number part and an imaginary number part, it is possible to reduce a peak-to-average ratio (PAR) at a UE transmitter by decreasing the frequency of zero crossing occurring in an RF constellation diagram. It is generally well known that the zero crossing occurring in the RF constellation diagram causes an increase in PAR, and the increase in PAR exerts an influence on the UE transmitter. The DPCCH multiplied by the imaginary number by the multiplier 920 is provided to the summer 921, where it is summed with the DPDCH provided from the multiplier 912. Since the DPCCH multiplied by an imaginary number is summed with the DPDCH multiplied by a real number signal, the characteristics of the DPCCH and the DPDCH remain unchanged.

As stated above, the DPCCH multiplied by the complex number j is an imaginary signal. Therefore, although the DPCCH is summed with HS-DPCCH, the characteristic of the DPCCH remains unchanged. Further, since the DPDCH and the HS-DPCCH were spread with different channelization codes, they do not interfere with each other during despreading at the receiver. Contrary to the DPCCH, the reason for adding DPDCH to HS-DPCCH, transmitting it over an I channel and transmitting the DPCCH over a Q channel is because the DPDCH is not transmitted when the DPDCH transmitted over the I channel has no user data or signaling information from an upper layer. If two DPCCHs are both transmitted over the Q channel while the DPDCH is not transmitted, the frequency of zero crossing is increased, causing an increase in PAR of the UE transmitter. Therefore, it is possible to reduce the PAR of the UE transmitter by transmitting the HS-DPCCH over the I channel. The complex output, DPDCH+DPCCH+HS-DPCCH, of the summer 921 is complex-multiplied by a multiplier 922 by an uplink scrambling code used in the UE, for scrambling, and then modulated by a modulator 923. The output of the modulator 923 is converted into an RF signal by an RF part 924, and then transmitted to a Node B through an antenna 925. The uplink scrambling code used by the multiplier 922 is a complex code used to identify UEs in the UMTS communication system.

Next, an internal structure of a Node B according to an embodiment of the present invention will be described with reference to FIG. 10.

Figure 10:
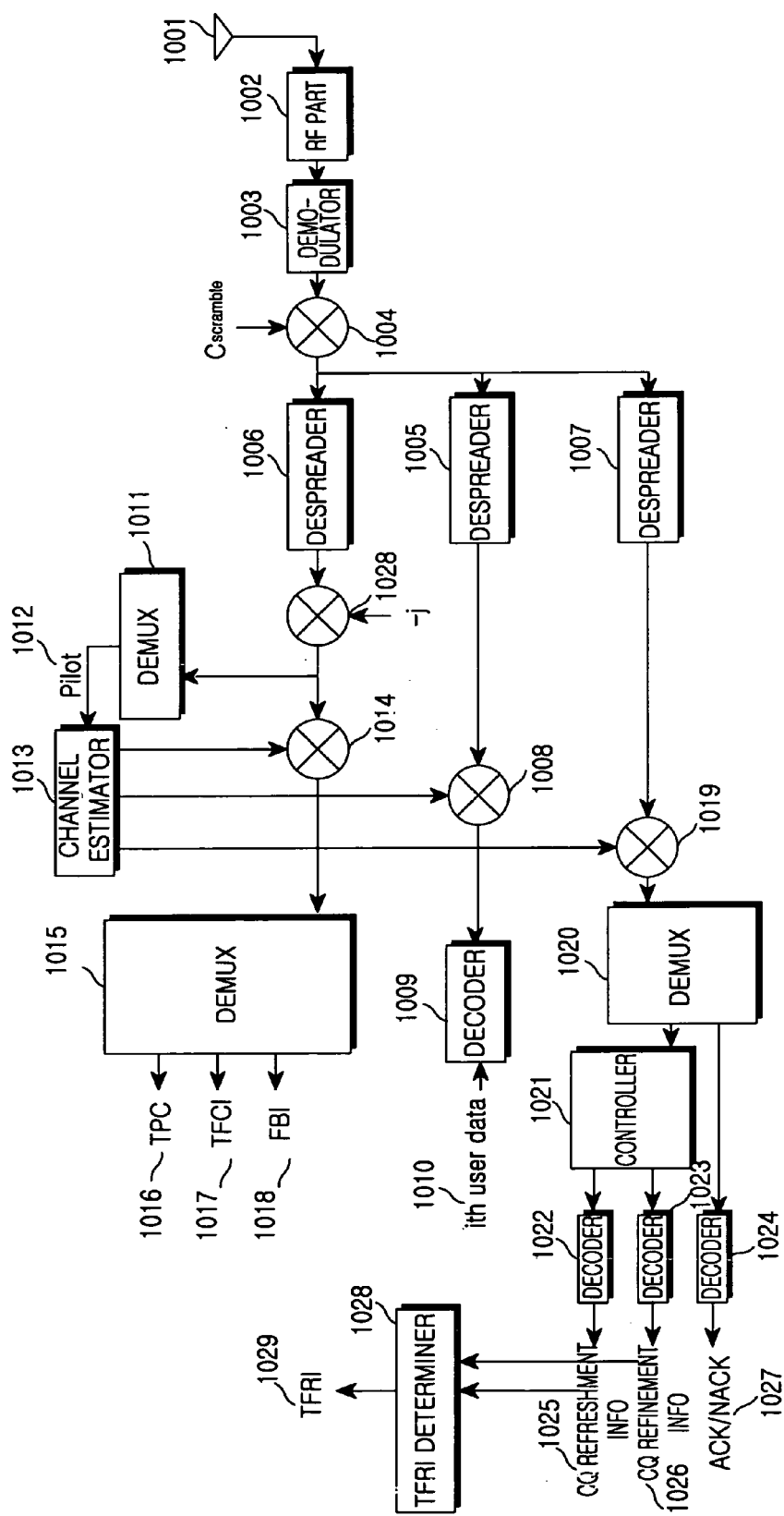
FIG. 10 is a block diagram illustrating an internal structure of a Node B receiver according to an embodiment of the present invention.

FIG. 10 is a block diagram illustrating an internal structure of a Node B receiver according to an embodiment of the present invention. Referring to FIG. 10, if a UE reports CQI information in the method described in conjunction with FIG. 6, an RF signal received through an antenna 1001 is converted into a baseband signal by an RF part 1002, demodulated by a demodulator 1003, and provided to a multiplier 1004. The multiplier 1004 multiplies the output signal of the demodulator 1003 by a scrambling code, for descrambling. Here, the scrambling code used by the multiplier 1004 is the same scrambling code as a scrambling code used by the multiplier 922 in the UE transmitter of FIG. 9, and serves to distinguish a signal transmitted by the UE of FIG. 9 from signals transmitted by other UEs, through descrambling.

An output signal of the multiplier 1004 is applied in common to despreaders 1005, 1006 and 1007, for despreading. A channelization code used by the despreader 1006 is identical to the channelization code used by the spreader 918 of FIG. 9, and a channelization code used by the despreader 1005 is identical to the channelization code used by the spreader 911 of FIG. 9. Further, a channelization code used by the despreader 1007 is identical to the channelization code used by the spreader 906 of FIG. 9. Since the channelization codes are orthogonal codes, the signals despread by the despreaders 1005, 1006 and 1007 are separated into DPDCH, DPCCH and HS-DPCCH. The DPCCH despread by the despreader 1006 is multiplied by –j by a multiplier 1028, and thus restored to a real signal. Here, the reason for multiplying the DPCCH by –j is to restore the imaginary DPCCH signal multiplied by j by the multiplier 920 of FIG. 9 to a real DPCCH signal. The real DPCCH signal is applied to a demultiplexer 1011 and a multiplier 1014.

The demultiplexer 1011 extracts only Pilot 1012 used for uplink channel estimation from the DPCCH signal, and provides the extracted Pilot 1012 to a channel estimator 1013. The Pilot 1012 provided to the channel estimator 1013 is used to estimate a channel environment between the UE and the Node B, and the channel estimator 1013 calculates a compensation value for the estimated channel environment, and provides the calculated compensation value to a multiplier 1014, a multiplier 1008 and a multiplier 1019. The DPCCH output from the multiplier 1028 is applied to the multiplier 1014, and the multiplier 1014 multiplies the DPCCH by the channel estimation value, the calculated compensation value for the channel environment, and provides its output to a demultiplexer 1015. The demultiplexer 1015 demultiplexes the DPCCH signal into TPC 1016, TFCI 1017 and FBI 1018, thus excepting the Pilot 1012. The TPC 1016 is used for downlink transmission power control, the TFCI 1017 for analysis of an uplink DPDCH signal, and the FBI 1018 for gain control on a closed-loop transmission antenna. The signal output from the multiplier 1004 is despread by the despreader 1005, and thus restored to a DPDCH signal. The despreader 1005 deletes the signals other than the DPDCH signal. The restored DPDCH signal is multiplied by the channel estimation signal by the multiplier 1008, and decoded into user data 1010 (or upper layer signal information) by a decoder 1009 with the channelization code used by the UE, i.e., the convolutional code or turbo code. The user data 1010 is transmitted to an upper layer.

Further, the output signal of the multiplier 1004 is despread by the despreader 1007, and thus restored to an HS-DPCCH signal. The despreader 1007 deletes other signals except the HS-DPCCH signal. The HS-DPCCH signal restored in the despreader 1007 is multiplied by a multiplier 1019 by the channel estimation value provided from the channel estimator 1013, for channel compensation, and then separated into ACK/NACK and CQI information by a demultiplexer 1020. Among the output signals of the demultiplexer 1020, ACK/NACK information is provided to a decoder 1024. The decoder 1024 generates ACK/NACK 1027 by performing a decoding operation corresponding to the repetition operation performed by the repeater 928 of FIG. 9. Among the output signals of the demultiplexer 1020, CQI information is provided to a controller 1021. The controller 1021 distinguishes CQ refinement information and CQ refreshment information. If the current TTI is a common multiple of M and TTI, the controller 1021 recognizes that the CQI information output from the demultiplexer 1020 is CQ refreshment information, and thus provides the CQI information to a decoder 1022. In the first channel quality reporting method, if the current TTI is a common multiple of N and TTI, the controller 1021 recognizes that the CQI information provided from the demultiplexer 1020 is CQ refinement information, and thus provides the CQI information to a decoder 1023. However, in the second channel quality reporting method, if the current TTI is not a common multiple of M and TTI, the controller 1021 unconditionally provides the CQI information output from the demultiplexer 1020 to the decoder 1023. The decoder 1022 and the decoder 1023 perform decoding through a reverse operation of the encoder 926 and the encoder 927 of FIG. 9. The output of the decoder 1022 becomes CQ refreshment information 1025 and the output of the decoder 1023 becomes CQ refinement information 1026. The CQ refreshment information 1025 and the CQ refinement information 1026 are provided to a TFRI determiner 1028. If the CQ refreshment information 1025 and the CQ refinement information 1026 are C/I measurement information, the TFRI determiner 1028 determines TFRI based on the C/I measurement. Further, if the CQ refreshment information 1025 and the CQ refinement information 1026 are TFRC information, the TFRI determiner 1028 judges whether the Node B can accept TFRC requested by the UE, and determines TFRI 1029 according to the determined result. The TFRI 1029 includes MCS level and transport format information, to be used by the Node B to transmit HS-DSCH to the UE.

Next, a structure for determining by a UE whether to transmit channel quality information according to an embodiment of the present invention will be described with reference to FIG. 15.

Figure 15:
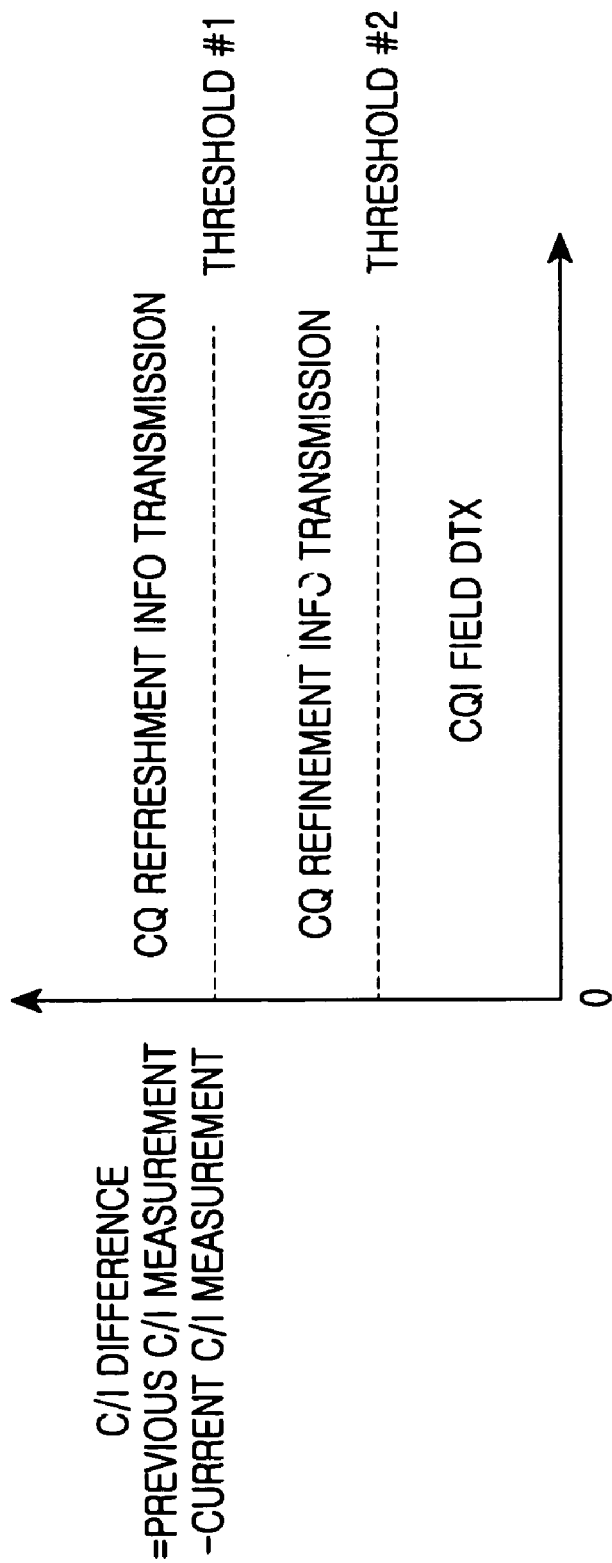
FIG. 15 illustrates a structure for determining by a UE whether to transmit channel quality information according to an embodiment of the present invention.

FIG. 15 illustrates a structure for determining by a UE whether to transmit channel quality information according to an embodiment of the present invention.

First, if a C/I difference between a previous C/I measurement and a current C/I measurement is larger than a preset threshold #1, a UE determines that a downlink channel condition is poor, and transmits CQ refreshment information to a Node B at the next TTI. Otherwise, if the C/I difference is smaller than or equal to the threshold #1 and larger than a preset threshold #2, the UE determines that the downlink channel quality should be compensated, and transmits CQ refinement information to the Node B at the next TTI. In addition, if the C/I measurement difference is smaller than the threshold #2, the UE determines that the downlink channel quality is acceptable, and subjects a CQI field of HS-DPCCH to DTX in order not to report information on the downlink channel quality. In this manner, the UE transmits CQ refreshment information or CQ refinement information according to the downlink channel condition, or does not make a report on the downlink channel quality. There are several criteria for determining by the UE whether it should transmit the CQ refreshment information or the CQ refinement information.

The UE transmits CQ refreshment information or CQ refinement information to the Node B over a CQI field of HS-DPCCH in accordance with the method described in conjunction with FIG. 15. In this case, the Node B is able to distinguish whether received information is CQ refreshment information or CQ refinement information. If the CQ refreshment information and the CQ refinement information are periodically transmitted, the Node B can distinguish whether the received information is CQ refreshment information or CQ refinement information, based on a reception point of the received information. However, in the method of FIG. 15, if a period for transmitting the CQ refreshment information and the CQ refinement information is irregular, the UE must take proper measures so that the Node B can distinguish between the CQ refreshment information and the CQ refinement information. The present invention includes the following two methods of distinguishing the CQ refreshment information and the CQ refinement information, transmitted at irregular intervals by the UE.

In a first method, the UE uses indicator bits in order to distinguish the CQ refreshment information and the CQ refinement information. That is, the UE transmits L-bit CQ refreshment information over HS-DPCCH along with K indicator bits, and transmits L-bit CQ refinement information over HS-DPCCH along with K indicator bits. For example, the indicator bits of 1 represent CQ refreshment information, and the indicator bits of 0 represent CQ refinement information.

In a second method, the UE uses different orthogonal codes for the CQ refreshment information and the CQ refinement information in order to distinguish the CQ refreshment information and the CQ refinement information. That is, the UE spreads the CQ refreshment information and the CQ refinement information with different orthogonal channelization codes, before transmission to the Node B. The reason for spreading the CQ refreshment information and the CQ refinement information with different orthogonal channelization codes is because for uplink transmission, all UEs can utilize all OVSF (Orthogonal Variable Spreading Factor) codes, so channelization code resources are sufficient. Then, the Node B can distinguish the CQ refreshment information and the CQ refinement information by performing despreading with the different orthogonal channelization codes used for the CQ refreshment information and the CQ refinement information.

In addition, the present invention provides two methods of using different orthogonal channelization codes for the CQ refreshment information and the CQ refinement information.

A first method uses different channelization codes for HS-DPCCH in order to distinguish the CQI information, and a second method uses different spreading codes for ACK/NACK, CQ refreshment information and CQ refinement information in order to distinguish the CQI information. In the first method of using different channelization codes for HS-DPCCH, ACK/NACK is multiplexed with CQI information and then spread with a channelization code before being transmitted to the Node B. In this case, the UE differently uses the channelization code. For example, If the CQI information is CQ refreshment information, the UE uses a channelization code C1 for HS-DPCCH, and if the CQI information is CQ refinement information, the UE uses a channelization code C2 for HS-DPCCH. In the second method, the UE uses different spreading codes for ACK/NACK, CQ refreshment information and CQ refinement information. For example, it will be assumed that there is a channelization code C3 for spreading the ACK/NACK information. The UE can spread the CQ refreshment information with a code C1, and the CQ refinement information with a code C2. In this manner, the UE can assign different spreading codes to the ACK/NACK information, CQ refreshment information and CQ refinement information. Shown in Table 4 are spreading codes assignable to ACK/NACK, CQ refreshment information and CQ refinement information. In Table 4, the spreading codes C1, C2 and C3 are orthogonal with one another. The first row of Table 4 corresponds to the second method and rows two and three correspond to the first method.

TABLE 4

| ACK/NACK | CQ refreshment information | CQ refinement information |
|---|---|---|
| C3 | C1 | C2 |
| C1 | C1 | C2 |
| C2 | C1 | C2 |

Next, a process of transmitting CQI information from a UE to a Node B according to an embodiment of the present invention will be described with reference to FIG. 16.

Figure 16:
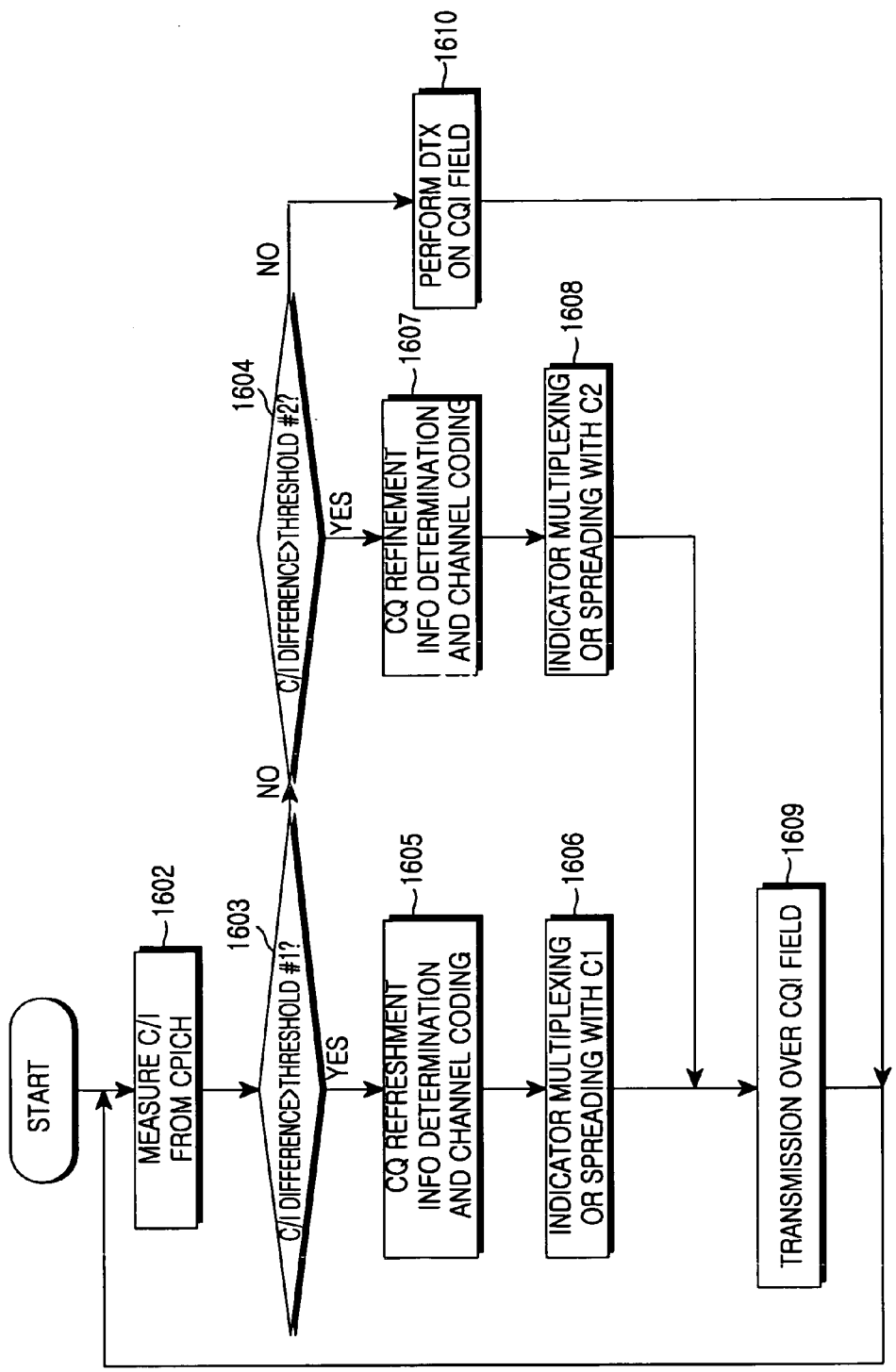
FIG. 16 is a flow chart illustrating a process of reporting CQI information by a UE according to an embodiment of the present invention.

FIG. 16 is a flow chart illustrating a process of reporting CQI information by a UE according to an embodiment of the present invention. Referring to FIG. 16, the UE measures a C/I using a received CPICH signal in step 1602, and determines in step 1603 whether a C/I difference between a previously measured C/I measurement and the currently measured C/I measurement is larger than a preset threshold #1. As a result of the determination, if the C/I difference between the previous C/I measurement and the current C/I measurement is larger than the threshold #1, the UE proceeds to step 1605. In step 1605, the UE recognizes that it must report CQ refreshment information to a Node B, and determines TFRC from Table 1 and Table 2 using a BLER threshold indicating the measured C/I measurement or proper performance, and then proceeds to step 1606. In step 1606, the UE multiplexes K indicator bits with CQ refreshment information bits so that the Node B can distinguish the CQ refreshment information, and then proceeds to step 1609. For example, the UE may insert an indicator bit of 1 in a CQI field in order to inform the Node B of the CQ refreshment information. Here, the UE may encode the indicator bit and then multiplex the coded indicator bit with the CQ refreshment information. Alternatively, in step 1606, the UE may spread the CQ refreshment information bits instead of the indicator bit with a code C1 so that the Node B can distinguish the CQ refreshment information. In step 1609, the UE transmits the bits generated in step 1606 over a CQI field of HS-DPCCH, and then returns to step 1602.

However, if it is determined in step 1603 that the C/I difference is smaller than or equal to the threshold #1, the UE determines in step 1604 whether the C/I difference is larger than a preset threshold #2. As a result of the determination, if the C/I difference is larger than the threshold #2, the UE determines that the downlink channel condition is poor, and thus proceeds to step 1607 in order to transmit CQ refinement information. In step 1607, if CQ refreshment information is a C/I measurement, the UE determines CQ refinement information as a C/I offset or an up/down command. Otherwise, if CQ refreshment information is TFRC information, the UE determines CQ refinement information as a TFRC offset or an up/down command, and a power offset or an up/down command. The UE proceeds to step 1608 after channel-coding the determined CQ refinement information. In step 1608, if indicator bits were used in step 1606 to distinguish the CQ refreshment information, the UE multiplexes K indicator bits with CQ refinement information bits so that the Node B can distinguish the CQ refinement information, and then proceeds to step 1609. For example, the UE may insert an indicator bit of 0 in a CQI field in order to inform the Node B of the CQ refinement information. Alternatively, in step 1608, if the CQ refreshment information was distinguished with a code C1 in step 1606, the UE may spread the CQ refinement information bits with a code C2. Here, the code C2 has an orthogonal property with the code C1 for the CQ refreshment information. In step 1609, the UE transmits the information bits generated in step 1606 or 1608 over a CQI field of HS-DPCCH, and then returns to step 1602. However, if it is determined in step 1604 that the C/I difference is smaller than or equal to the threshold #2, the UE determines that it is not necessary to report the downlink channel quality because the downlink channel condition is good, and then proceeds to step 1610. In step 1610, the UE subjects the CQI field to DTX, and then returns to step 1602.

Next, a process of transmitting by a Node B a downlink channel signal based on CQI information received from a UE according to an embodiment of the present invention will be described with reference to FIG. 17.

Figure 17:
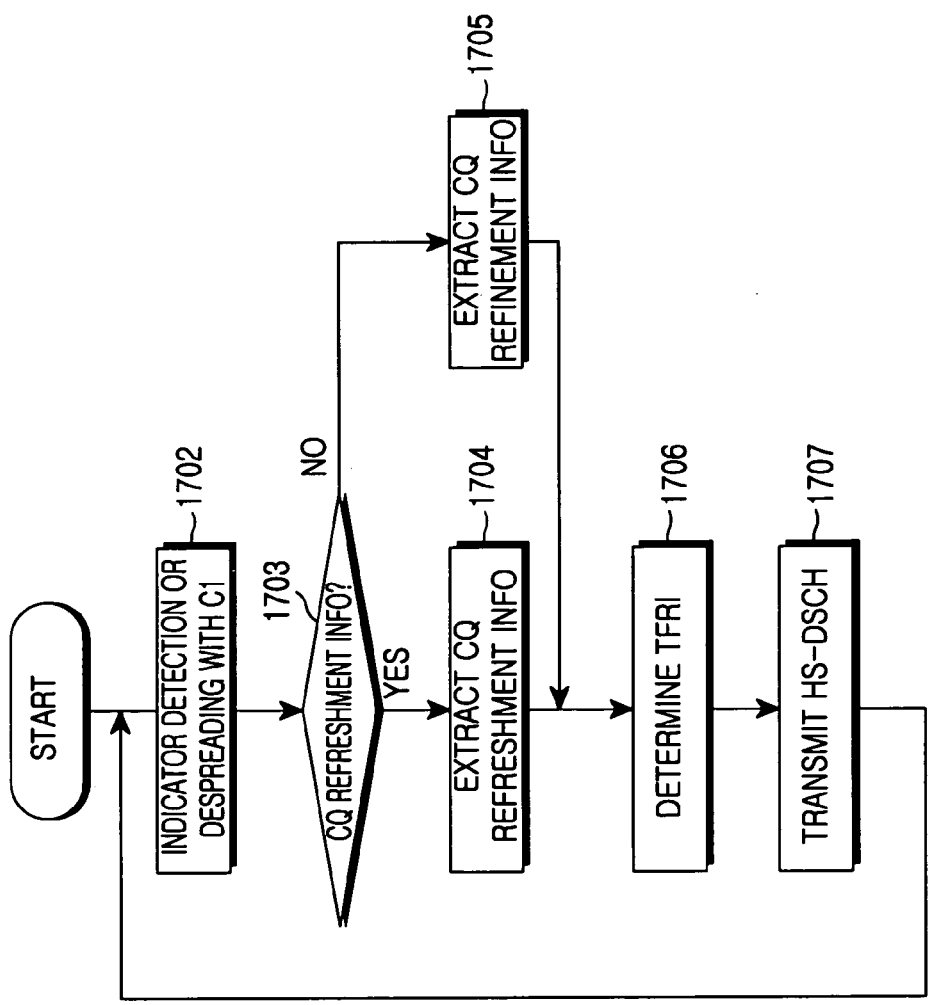
FIG. 17 is a flow chart illustrating a process of transmitting by a Node B a downlink channel signal based on received CQI information according to an embodiment of the present invention.

FIG. 17 is a flow chart illustrating a process of transmitting by a Node B a downlink channel signal based on received CQI information according to an embodiment of the present invention. Referring to FIG. 17, a Node B determines in step 1702 whether downlink channel information reported by a UE is CQ refreshment information or CQ refinement information, and then proceeds to step 1703. If the UE uses an indicator bit in order to distinguish the CQ refreshment information and the CQ refinement information, the Node B will determine in step 1702 whether the downlink channel information is CQ refreshment information or CQ refinement information by detecting an indicator on a CQI field received from the UE. However, if the UE distinguishes the CQ refreshment information and the CQ refinement information using orthogonal codes, the Node B will determine in step 1702 whether CQ refreshment information is detected, by despreading the downlink channel information with a code C1. In step 1703, the Node B determines whether the information detected in step 1702 is CQ refreshment information. As a result of the determination, if the detected information is CQ refreshment information, the Node B proceeds to step 1704. In step 1704, the Node B extracts the CQ refreshment information through decoding, and then proceeds to step 1706.

In step 1706, if the detected CQ refreshment information is a C/I measurement, the Node B determines TFRI of HS-DSCH according to the quality of the downlink channel. Otherwise, if the detected CQ refreshment information is TFRC information, the Node B determines TFRI by judging whether it can receive TFRC requested by the UE, and then proceeds to step 1707. Here, the TFRI represents an MCS level and a transport format for the actual HS-DSCH. If the Node B can accept the received TFRC, the Node B reflects the intact TFRC in the TFRI. Otherwise, the Node B generates TFRI by modifying the received TFRC so that the Node B can accept the TFRC. In step 1707, the Node B transmits an HS-DSCH signal according to the determined TFRI, and then returns to step 1702.

However, if it is determined in step 1703 that the detected information is not the CQ refreshment information, the Node B proceeds to step 1705. Here, if the detected information is not the CQ refreshment information, the detected information is CQ refinement information. In step 1705, the Node B extracts CQ refinement information through decoding, and then proceeds to step 1706 where it determines TFRI.

Next, a UE receiver for determining CQ refreshment information or CQ refinement information is equal in structure to the UE receiver illustrated in FIG. 8 except a function of the controller 808. This will be described in more detail herein below. In the foregoing description, in order to generate CQ refreshment information at periods of M TTIs, the controller 808 provides the output of the channel analyzer 807 to the CQ refreshment information determiner 809. In addition, if the C/I difference is larger than the threshold #2, the controller 808 provides the output of the channel analyzer 807 to the CQ refinement information determiner 810 in order to generate the CQ refinement information at periods of N TTIs. However, in order for the UE to generate information for reporting the downlink channel quality as described in conjunction with FIG. 16, a function of the controller 808 must be changed as follows. The controller 808 calculates a C/I difference between a previous C/I measurement and a current C/I measurement from the channel analyzer 807, and determines whether the C/I difference is larger than a threshold #1. If the C/I difference is larger than the threshold #1, the controller 808 provides a C/I measurement output from the channel analyzer 807 to the CQ refreshment information determiner 809 in order to generate the CQ refreshment information. However, if the C/I difference is smaller than or equal to the threshold #1 and larger than a threshold #2, the controller 808 provides a C/I measurement output from the channel analyzer 807 to the CQ refinement information determiner 810 in order to generate the CQ refinement information. In this manner, the UE generates the CQ refreshment information 811 and the CQ refinement information 812 by the CQ refreshment information determiner 809 and the CQ refinement information determiner 810, respectively.

Next, a structure of a UE transmitter according to an embodiment of the present invention will be described with reference to FIG. 18.

Figure 18:
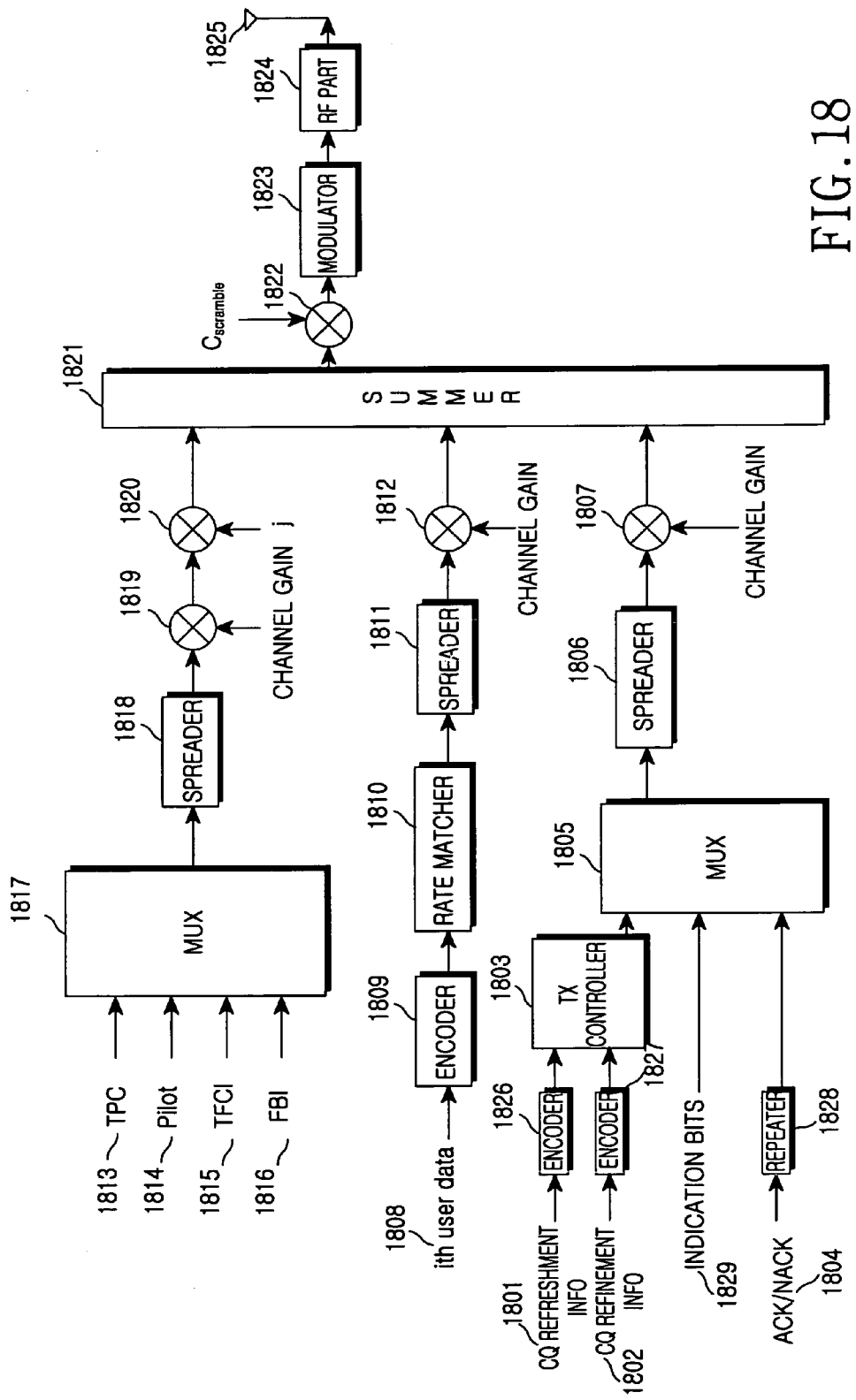
FIG. 18 is a block diagram illustrating an internal structure of a UE transmitter according to an embodiment of the present invention.

FIG. 18 is a block diagram illustrating an internal structure of a UE transmitter according to an embodiment of the present invention. CQ refreshment information 1801 and CQ refinement information 1802 determined in the method described in conjunction with FIG. 15 are encoded by an encoder 1826 and an encoder 1827, respectively, and then provided to a transmission controller 1803. The encoders 1826 and 1827 encode the CQ refreshment information 1801 and the CQ refinement information 1802 into K coded bits, respectively. Transmission points of the coded bits output from the encoders 1826 and 1827 are determined by the transmission controller 1803. If a C/I difference is larger than a preset threshold #1, the transmission controller 1803 provides the output of the encoder 1826 to a multiplexer 1805. At this moment, the UE will insert K indictor bits 1829 so that the Node B can distinguish CQI information. In this case, since the CQI information is CQ refreshment information 1801, the transmission controller 1803 applies the indicator bits 1829 to the multiplexer 1805 after setting the indicator bits 1829 to indicate the CQ refreshment information 1801. For example, the indictor bits 1829 may be set to 1 in order to indicate the CQ refreshment information 1801. Likewise, if the C/I difference is smaller than or equal to the threshold #1 and larger than a preset threshold #2, i.e., only if the channel condition is somewhat poor, the transmission controller 1803 is enabled to transmit CQ refinement information. In this case, therefore, the transmission controller 1803 provides the output of the encoder 1827 to the multiplexer 1805. Further, the UE sets the K indicator bits 1829 to indicate that the CQI information is CQ refinement information 1802, and then applies the indicator bits 1829 to the multiplexer 1805. For example, the indicator bits 1830 may be set to 0 in order to indicate the CQ refinement information 1802.

Meanwhile, ACK/NACK 1804 is encoded into K1 coded bits by a repeater 1828. The output of the transmission controller 1803, the output of the repeater 1828 and the indicator bits 1829, after transmission points of which are determined by the multiplexer 1805, are spread with a spreading code for HS-DPCCH by a spreader 1806. The spread signal is multiplied by a channel gain by a multiplier 1807. An output signal of the multiplier 1807 is provided to a summer 1821, where it is summed with DPDCH and DPCCH.

Further, user data 1808 (or signaling information from an upper layer) is channel-coded with a convolutional code or turbo code by an encoder 1809, and provided to a rate matcher 1810. The rate matcher 1810 performs puncturing or repetition and interleaving on the channel coded data from the encoder 1809 so that the channel coded data is suitable to a DPDCH slot format. The output data of the rate matcher 1810 is provided to a spreader 1811, where it is multiplied by a channelization code used for spreading DPDCH. The user data spread by the spreader 1811 is multiplied by a channel gain by a multiplier 1812. The DPDCH output from the multiplier 1812 is provided to the summer 1821, where it is summed with DPCCH. In FIG. 18, TPC 1813, Pilot 1814, TFCI 1815, and FBI 1816 are multiplexed by a multiplexer 1817 to construct DPCCH. The DPCCH multiplexed by the multiplexer 1817 is spread with a channelization code for DPCCH by a spreader 1818, and then multiplied by a channel gain for controlling transmission power of DPCCH by a multiplier 1819. An output signal of the multiplier 1819 is multiplied by a complex number j by a multiplier 1820. The DPCCH multiplied by the imaginary number by the multiplier 1820 is provided to the summer 1821, where it is summed with the DPDCH provided from the multiplier 1812. However, since the DPCCH multiplied by an imaginary number is summed with the DPDCH multiplied by a real number signal, the characteristics of the DPCCH and the DPDCH remain unchanged. The complex output, DPDCH+DPCCH+HS-DPDCH, of the summer 1821 is complex-multiplied by a multiplier 1822 by an uplink scrambling code used in the UE, for scrambling, and then modulated by a modulator 1823. The output of the modulator 1823 is converted into an RF signal by an RF part 1824, and then transmitted to a Node B through an antenna 1825. The uplink scrambling code used by the multiplier 1822 is a complex code used to identify UEs in the UMTS communication system.

Next, an internal structure of a Node B according to an embodiment of, the present invention will be described with reference to FIG. 19.

Figure 19:
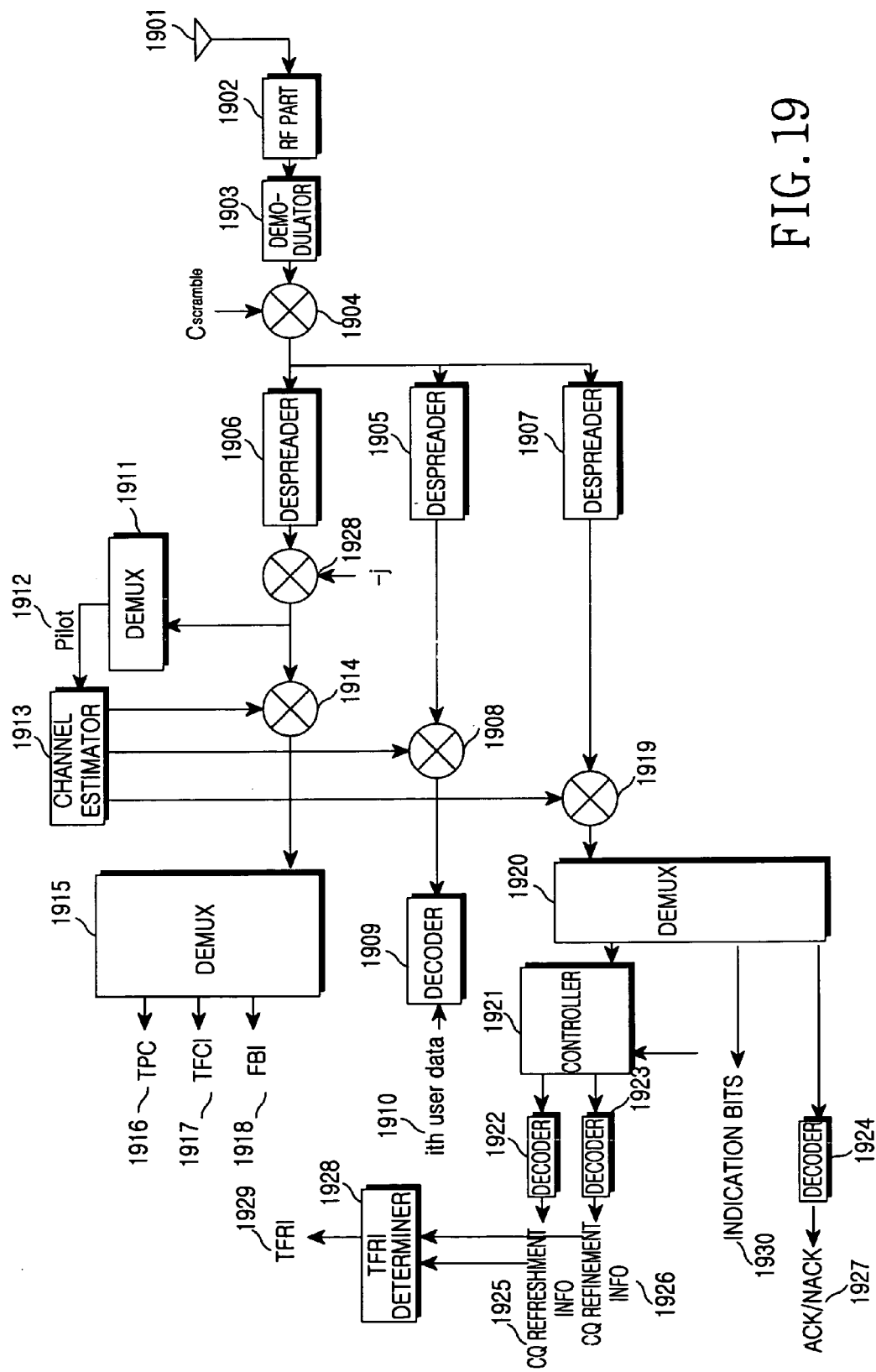
FIG. 19 is a block diagram illustrating an internal structure of a Node B receiver according to an embodiment of the present invention.

FIG. 19 is a block diagram illustrating an internal structure of a Node B receiver according to an embodiment of the present invention. Referring to FIG. 19, an RF signal received from a UE through an antenna 1901 is converted into a baseband signal by an RF part 1902, demodulated by a demodulator 1903, and provided to a multiplier 1904. The multiplier 1004 multiplies the output signal of the demodulator 1903 by a scrambling code, for descrambling. The scrambling code used by the multiplier 1904 is the same scrambling code as a scrambling code used by the multiplier 1822 in the UE transmitter of FIG. 18, and serves to distinguish a signal transmitted by the UE of FIG. 18 from signals transmitted by other UEs, through descrambling.

An output signal of the multiplier 1904 is applied in common to despreaders 1905, 1906 and 1907, for despreading. A channelization code used by the despreader 1906 is identical to the channelization code used by the spreader 1818 of FIG. 18, and a channelization code used by the despreader 1905 is identical to the channelization code used by the spreader 1811 of FIG. 18. Further, a channelization code used by the despreader 1907 is identical to the channelization code used by the spreader 1806 of FIG. 18. Since the channelization codes are orthogonal codes, the signals despread by the despreaders 1905, 1906 and 1907 are separated into DPDCH, DPCCH and HS-DPCCH. The DPCCH despread by the despreader 1906 is multiplied by −j by a multiplier 1928, and thus restored to a real signal. Here, the reason for multiplying the DPCCH by −j is to restore the imaginary DPCCH signal multiplied by j by the multiplier 1820 of FIG. 18 to a real DPCCH signal. The real DPCCH signal is applied to a demultiplexer 1911 and a multiplier 1914.

The demultiplexer 1911 extracts only Pilot 1912 used for uplink channel estimation from the DPCCH signal, and provides the extracted Pilot 1912 to a channel estimator 1913. The Pilot 1912 provided to the channel estimator 1913 is used to estimate a channel environment between the UE and the Node B, and the channel estimator 1913 calculates a compensation value for the estimated channel environment, and provides the calculated compensation value to a multiplier 1914, a multiplier 1908 and a multiplier 1919. The DPCCH output from the multiplier 1928 is applied to the multiplier 1914, and the multiplier 1914 multiplies the DPCCH by the channel estimation value, the calculated compensation value for the channel environment, and provides its output to a demultiplexer 1915. The demultiplexer 1915 demultiplexes the DPCCH signal into TPC 1916, TFCI 1917 and FBI 1918, thus excepting the Pilot 1912. The TPC 1916 is used for downlink transmission power control, the TFCI 1917 for analysis of an uplink DPDCH signal, and the FBI 1918 for gain control on a closed-loop transmission antenna. The signal output from the multiplier 1904 is despread by the despreader 1905, and thus restored to a DPDCH signal. The despreader 1905 deletes the signals other than the DPDCH signal. The restored DPDCH signal is multiplied by the channel estimation signal by the multiplier 1908, and decoded into user data 1910 (or upper layer signal information) by a decoder 1909 with the channelization code used by the UE, i.e., the convolutional code or turbo code. The user data 1910 is transmitted to an upper layer.

Further, the output signal of the multiplier 1904 is despread by the despreader 1907, and thus restored to an HS-DPCCH signal. The despreader 1907 deletes other signals except the HS-DPCCH signal. The HS-DPCCH signal restored in the despreader 1907 is multiplied by a multiplier 1919 by the channel estimation value provided from the channel estimator 1913, for channel compensation, and then separated into ACK/NACK and CQI information by a demultiplexer 1920. Among the output signals of the demultiplexer 1920, ACK/NACK information is provided to a decoder 1924. The decoder 1924 generates ACK/NACK 1927 by performing a decoding operation corresponding to the repetition operation performed by the repeater 1828 of FIG. 18. Among the output signals of the demultiplexer 1920, CQI information is provided to a controller 1921. Further, among the output signals of the demultiplexer 1920, K indicator bits 1930 are provided to the controller 1921. The controller 1921 analyzes the K indictor bits 1930, and distinguishes whether the CQI information, downlink channel quality information reported by the UE, is CQ refreshment information or CQ refinement information. For example, if the indicator bits 1930 represent 1, the controller 1921 determines the CQI information as CQ refreshment information, and if the indicator bits 1930 represent 0, the controller 1921 determines the CQI information as CQ refinement information. If the controller 1921 recognizes that the CQI information received from the demultiplexer 1920 is CQ refreshment information by analyzing the indicator bits 1930, the controller 1921 provides the CQ refreshment information to a decoder 1922. Otherwise, if the controller 1921 recognizes that the CQI information received from the demultiplexer 1920 is CQ refinement information by analyzing the indicator bits 1930, the controller 1921 provides the CQ refinement information to a decoder 1923.

The decoder 1922 and the decoder 1923 perform decoding through a reverse operation of the encoder 1826 and the encoder 1827 of FIG. 18. The output of the decoder 1922 becomes CQ refreshment information 1925 and the output of the decoder 1923 becomes CQ refinement information 1926. The CQ refreshment information 1925 and the CQ refinement information 1926 are provided to a TFRI determiner 1928. If the CQ refreshment information 1925 and the CQ refinement information 1926 are C/I measurement information, the TFRI determiner 1928 determines TFRI based on the C/I measurement. Further, if the CQ refreshment information 1925 and the CQ refinement information 1926 are TFRC information, the TFRI determiner 1928 judges whether the Node B can accept TFRC requested by the UE, and determines TFRI 1929 according to the determined result. The TFRI 1929 includes MCS level and transport format information, to be used by the Node B to transmit an HS-DSCH signal to the UE.

Next, a structure of a UE transmitter according to an embodiment of the present invention will be described with reference to FIG. 20.

Figure 20:
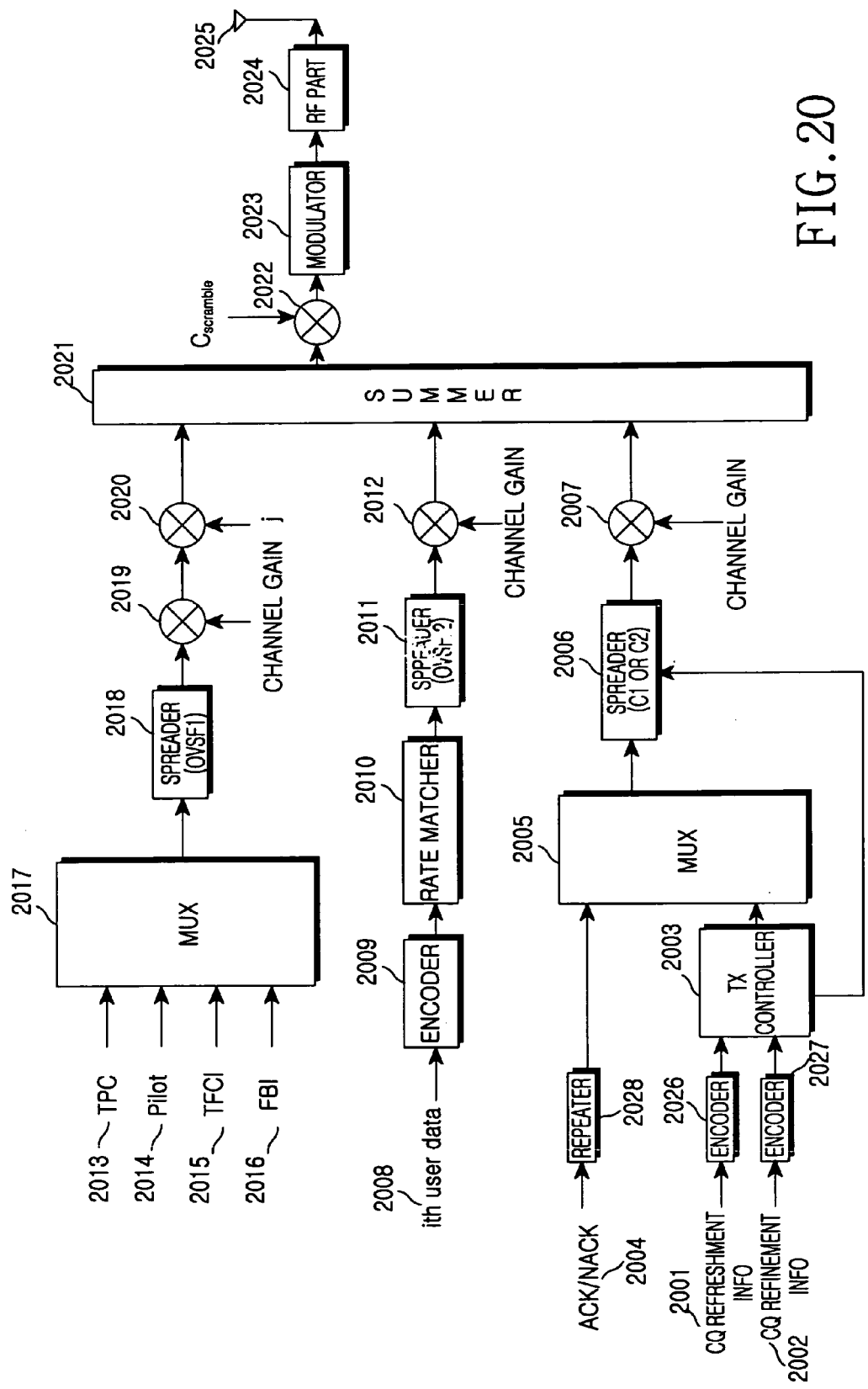
FIG. 20 is a block diagram illustrating an internal structure of a UE transmitter according to an embodiment of the present invention.

FIG. 20 is a block diagram illustrating an internal structure of a UE transmitter according to an embodiment of the present invention. In FIG. 20, the UE transmitter uses different channelization codes so that a Node B can distinguish CQI information. In the foregoing description, the present invention has provided a method of differently using a channelization code for HS-DPCCH in order to distinguish CQI information, and another method of using different spreading codes for ACK/NACK, CQ refreshment information and CQ refinement information in order to distinguish the CQI information. For example, in FIG. 20, the UE transmitter differently uses the channelization code for HS-DPCCH in order to distinguish the CQI information.

Referring to FIG. 20, CQ refreshment information 2001 and CQ refinement information 2002, determined as described in conjunction with FIG. 15, are encoded by an encoder 2026 and 2027, respectively, and then provided to a transmission controller 2003. The encoders 2026 and 2027 channel-code the CQ refreshment information 2001 and the CQ refinement information 2002 into K2 bits, respectively.

Transmission points of the signals output from the encoder 2026 and 2027 are determined by the transmission controller 2003. If a C/I difference is larger than a threshold #1, the transmission controller 2003 provides the output of the encoder 2026 to a multiplexer 2005. The transmission controller 2003 sets a spreading code to be used for a spreader 2006 so that the Node B can distinguish the CQI information. Here, since the CQI information is CQ refreshment information 2001, the transmission controller 2003 sets a spreading code used for the spreader 2006 to C1, and provides the set spreading code C1 to the multiplexer 2005. Likewise, if the C/I difference is smaller than or equal to the threshold #1 and larger than a preset threshold #2, i.e., only if the channel condition is somewhat poor, the transmission controller 2003 is enabled to transmit CQ refinement information. In this case, therefore, the transmission controller 2003 provides the output of the encoder 2027 to the multiplexer 2005. Further, the transmission controller 2003 sets the spreading code used for the spreader 2006 to C2, and then provides the set spreading code C2 to the multiplexer 2005. The spreading codes C1 and C2 used for the spreader 2006 are orthogonal to each other. Meanwhile, ACK/NACK 2004 is encoded into K1 coded bits by an encoder 2028. The output of the transmission controller 2003, the output of the encoder 2028 and indicator bits 2029, after transmission points of which are determined by the multiplexer 2005, are spread with a spreading code for HS-DPCCH by the spreader 2006. The spreader 2006 uses the spreading code C1 or the spreading code C2, which were set by the transmission controller 2003 according to the CQI information. The spread signal is multiplied by a channel gain by a multiplier 2007. An output signal of the multiplier 2007 is provided to a summer 2021, where it is summed with DPDCH and DPCCH.

Further, user data 2008 (or signaling information from an upper layer) is channel-coded with a convolutional code or turbo code by an encoder 2009, and provided to a rate matcher 2010. The rate matcher 2010 performs puncturing or repetition and interleaving on the channel coded data from the encoder 2009 so that the channel coded data is suitable to a DPDCH slot format. The output data of the rate matcher 2010 is provided to a spreader 2011, where it is multiplied by a channelization code used for spreading DPDCH. The user data spread by the spreader 2011 is multiplied by a channel gain by a multiplier 2012. The DPDCH output from the multiplier 2012 is provided to the summer 2021, where it is summed with DPCCH. In FIG. 20, TPC 2013, Pilot 2014, TFCI 2015, and FBI 2016 are multiplexed by a multiplexer 2017 to construct DPCCH. The DPCCH multiplexed by the multiplexer 2017 is spread with a channelization code for DPCCH by a spreader 2018, and then multiplied by a channel gain for controlling transmission power of DPCCH by a multiplier 2019. An output signal of the multiplier 2019 is multiplied by a complex number j by a multiplier 2020. The DPCCH multiplied by the imaginary number by the multiplier 2020 is provided to the summer 2021, where it is summed with the DPDCH provided from the multiplier 2012. However, since the DPCCH multiplied by an imaginary number is summed with the DPDCH multiplied by a real number signal, the characteristics of the DPCCH and the DPDCH remain unchanged. The complex output, DPDCH+DPCCH+HS-DPCCH, of the summer 2021 is complex-multiplied by a multiplier 2022 by an uplink scrambling code used in the UE, for scrambling, and then modulated by a modulator 2023. The output of the modulator 2023 is converted into an RF signal by an RF part 2024, and then transmitted to a Node B through an antenna 2025. The uplink scrambling code used by the multiplier 2022 is a complex code used to identify UEs in the UMTS communication system.

Next, an internal structure of a Node B receiver according to an embodiment of the present invention will be described with reference to FIG. 21.

Figure 21:
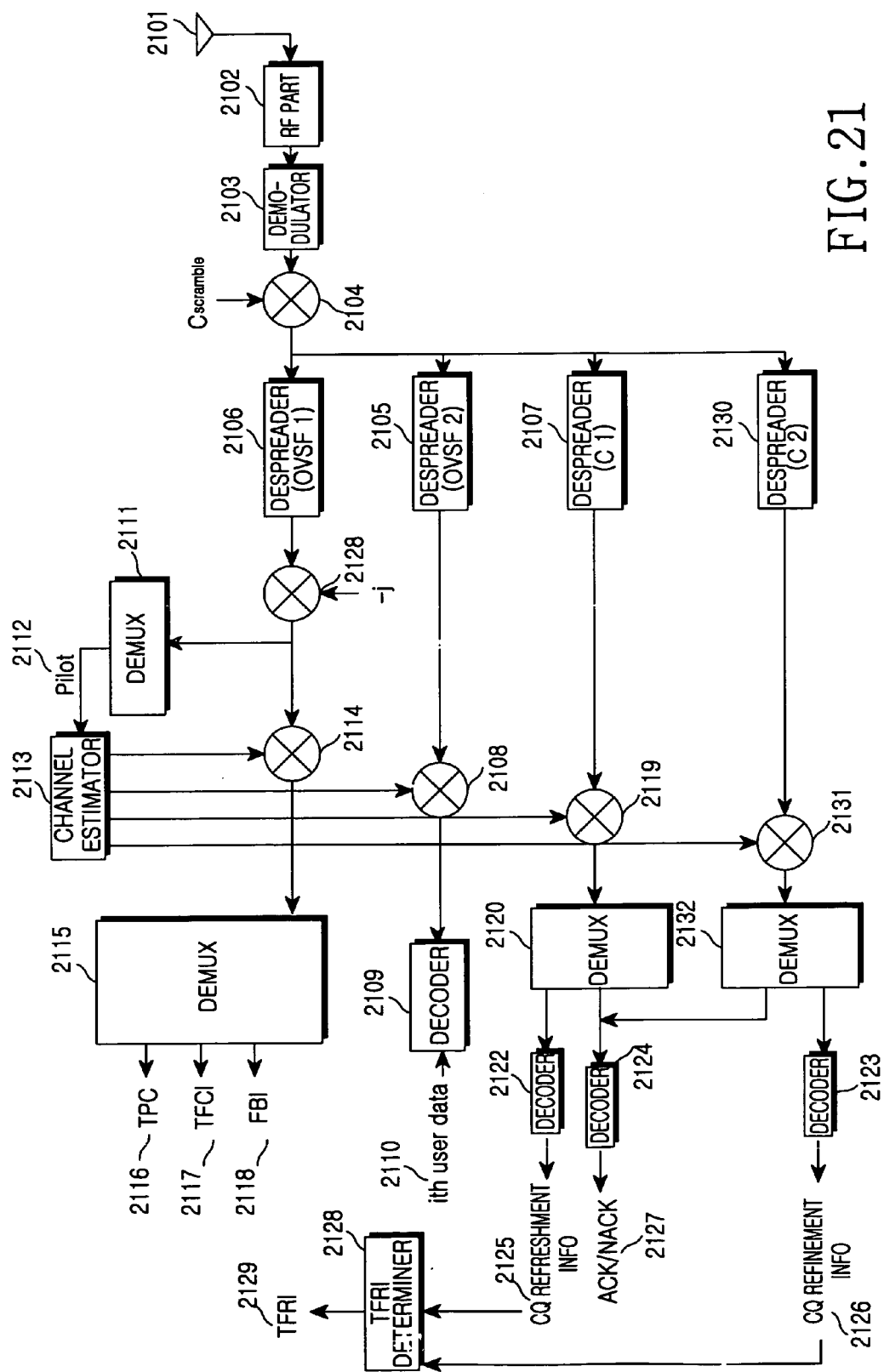
FIG. 21 is a block diagram illustrating an internal structure of a Node B receiver according to an embodiment of the present invention.

FIG. 21 is a block diagram illustrating an internal structure of a Node B receiver according to an embodiment of the present invention. Referring to FIG. 21, an RF signal received from a UE through an antenna 2101 is converted into a baseband signal by an RF part 2102, demodulated by a demodulator 2103, and provided to a multiplier 2104. The multiplier 2104 multiplies the output signal of the demodulator 2103 by a scrambling code, for descrambling. The scrambling code used by the multiplier 2104 is the same scrambling code as a scrambling code used by the multiplier 2022 in the UE transmitter of FIG. 20, and serves to distinguish a signal transmitted by the UE of FIG. 20 from signals transmitted by other UEs, through descrambling.

An output signal of the multiplier 2104 is applied in common to despreaders 2105, 2106, 2107 and 2130, for despreading. A channelization code used by the despreader 2106 is identical to the channelization code used by the spreader 2018 of FIG. 20, and a channelization code used by the despreader 2105 is identical to the channelization code used by the spreader 2011 of FIG. 20. Further, a channelization code used by the despreader 2107 is identical to a channelization code C1 used by the spreader 2006 of FIG. 20 when the CQI information is CQ refreshment information, and a channelization code used by the despreader 2130 is identical to a channelization code C2 used by the spreader 2006 of FIG. 20 when the CQI information is CQ refinement information. Since the channelization codes are orthogonal codes, the signals despread by the despreaders 2105, 2106, 2107 and 2130 are separated into DPDCH, DPCCH, HS-DPCCH for the case where the CQI information is CQ refreshment information and HS-DPCCH for the case where the CQI information is CQ refinement information, respectively. The DPCCH despread by the despreader 2106 is multiplied by −j by a multiplier 2128, and thus restored to a real signal. Here, the reason for multiplying the DPCCH by −j is to restore the imaginary DPCCH signal multiplied by j by the multiplier 2020 of FIG. 20 to a real DPCCH signal. The real DPCCH signal is applied to a demultiplexer 2111 and a multiplier 2114.

The demultiplexer 2111 extracts only Pilot 2112 used for uplink channel estimation from the DPCCH signal, and provides the extracted Pilot 2112 to a channel estimator 2113. The Pilot 2112 provided to the channel estimator 2113 is used to estimate a channel environment between the UE and the Node B, and the channel estimator 2113 calculates a compensation value for the estimated channel environment, and provides the calculated compensation value to a multiplier 2114, a multiplier 2108, a multiplier 2119 and a multiplier 2131. The DPCCH output from the multiplier 2128 is applied to the multiplier 2114, and the multiplier 2114 multiplies the DPCCH by the channel estimation value, the calculated compensation value for the channel environment, and provides its output to a demultiplexer 2115. The demultiplexer 2115 demultiplexes the DPCCH signal into TPC 2116, TFCI 2117 and FBI 2118, thus excepting the Pilot 2112. The TPC 2116 is used for downlink transmission power control, the TFCI 2117 for analysis of an uplink DPDCH signal, and the FBI 2118 for gain control on a closed-loop transmission antenna. The signal output from the multiplier 2104 is despread by the despreader 2105, and thus restored to a DPDCH signal. The despreader 2105 deletes the signals other than the DPDCH signal. The restored DPDCH signal is multiplied by the channel estimation signal by the multiplier 2108, and decoded into user data 2110 (or upper layer signal information) by a decoder 2109 with the channelization code used by the UE, i.e., the convolutional code or turbo code. The user data 2110 is transmitted to an upper layer.

Further, the output signal of the multiplier 2104 is despread by the despreader 2107, and thus restored to an HS-DPCCH signal for the case where the CQI information is CQ refreshment information. The despreader 2107 deletes other signals except the HS-DPCCH signal for the case where the CQI information is CQ refreshment information. The HS-DPCCH signal restored in the despreader 2107, for the case where the CQI information is CQ refreshment information, is multiplied by a multiplier 2119 by the channel estimation value provided from the channel estimator 2113, for channel compensation, and then separated into ACK/NACK and CQ refreshment information by a demultiplexer 2120. Among the output signals of the demultiplexer 2120, ACK/NACK information is provided to a decoder 2124. The decoder 2124 generates ACK/NACK 2127 by performing a decoding operation corresponding to the repetition operation performed by the repeater 2028 of FIG. 20. Since the CQI information from the demultiplexer 2120 is CQ refreshment information, the CQI information is provided to an decoder 2122. Further, the output signal of the multiplier 2104 is despread by the despreader 2130, and thus restored to an HS-DPCCH signal for the case where the CQI information is CQ refinement information. The despreader 2130 deletes other signals except the HS-DPCCH signal for the chase where the CQI information is CQ refinement information. The HS-DPCCH signal from the multiplier 2131 for the case where the CQI information is CQ refinement information, is multiplied by the channel estimation signal from the channel estimator 2113 by the multiplier 2131, for channel compensation, and separated into ACK/NACK and CQ refinement information by a demultiplexer 2132. Among the output signals of the demultiplexer 2132, ACK/NACK information is provided to the decoder 2124, and the decoder 2124 generates ACK/NACK 2127 by performing a decoding operation corresponding to the repetition operation performed by the repeater 2028 of FIG. 20. Since the CQI information from the demultiplexer 2120 is CQ refinement information, the CQI information is provided to an decoder 2123.

The decoder 2122 and the decoder 2123 perform decoding through a reverse operation of the encoder 2026 and the encoder 2027 of FIG. 20. The output of the decoder 2122 becomes CQ refreshment information 2125 and the output of the decoder 2123 becomes CQ refinement information 2126. The CQ refreshment information 2125 and the CQ refinement information 2126 are provided to a TFRI determiner 2128. If the CQ refreshment information 2125 and the CQ refinement information 2126 are C/I measurement information, the TFRI determiner 2128 determines TFRI based on the C/I measurement. Further, if the CQ refreshment information 2125 and the CQ refinement information 2126 are TFRC information, the TFRI determiner 2128 judges whether the Node B can accept TFRC requested by the UE, and determines TFRI 2129 according to the determined result. The TFRI 2129 includes MCS level and transport format information, to be used by the Node B to transmit an HS-DSCH signal to the UE.

As described above, in an HSDPA communication system according to the present invention, a UE transmits downlink channel quality information with minimized uplink interference. In addition, the UE adaptively transmits the downlink channel quality information according to a channel condition, contributing to an increase in efficiency of transmission resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reporting downlink channel quality in a high-speed packet data communication system, comprising the steps of:
   measuring downlink channel quality from a reference channel signal received from a Node B;
   after measuring the downlink channel quality, determining whether a current TTI (Transmission Time Interval) is a TTI corresponding to a multiple of a first transmission period or a TTI corresponding to a multiple of a second transmission period;
   if the current TTI is a TTI corresponding to a multiple of the first transmission period, determining CQ (Channel Quality) refreshment information for a downlink channel received from the Node B based on the measured downlink channel quality, and transmitting the determined CQ refreshment information to the Node B; and
   if the current TTI is a TTI corresponding to a multiple of the second transmission period, determining CQ refinement information for the downlink channel based on the measured downlink channel quality, and transmitting the determined CQ refinement information to the Node B.

2. The method of claim 1, wherein the CQ refinement information includes an offset for the CQ refreshment information.

3. The method of claim 1, wherein the downlink channel quality is a carrier-to-interference ratio (C/I), the CQ refreshment information is set to the measured C/I, and the CQ refinement information includes one of a C/I offset and an up/down command.

4. The method of claim 1, wherein the downlink channel quality is a C/I, the CQ refreshment information is set to TFRC (Transport Format and Resource Combination), and the CQ refinement information includes one of a TFRC offset and an up/down command.

5. The method of claim 1, wherein the downlink channel quality is a C/I, the CQ refreshment information is set to TFRC, and the CQ refinement information includes one of a power offset of the downlink channel and an up/down command.

6. The method of claim 1, wherein the first TTI is longer than a second TTI.

7. A method for reporting downlink channel quality in a high-speed packet communication system, comprising the steps of:
   measuring downlink channel quality from a received reference channel signal;
   after measuring the downlink channel quality, determining whether a current TTI (Transmission Time Interval) is a TTI corresponding to a multiple of a first transmission period;
   if the current TTI is a TTI corresponding to a multiple of the first transmission period, determining CQ (Channel Quality) refreshment information for a downlink channel received from a Node B based on the measured downlink channel quality, and transmitting the determined CQ refreshment information to the Node B; and if the current TTI is not a TTI corresponding to a multiple of the first transmission period, determining CQ refinement information for the downlink channel only when a difference between a downlink channel quality measured in a previous TTI and the measured downlink channel quality is larger than a preset threshold, and transmitting the determined CQ refinement information to the Node B.

8. The method of claim 7, wherein the CQ refinement information includes an offset for the CQ refinement information.

9. The method of claim 7, wherein the downlink channel quality is a carrier-to-interference ratio (C/I), the CQ refreshment information is set to the measured C/I, and the CQ refinement information includes one of a C/I offset and an up/down command.

10. The method of claim 7, wherein the downlink channel quality is a C/I, the CQ refreshment information is set to TFRC (Transport Format and Resource Combination), and the CQ refinement information includes one of a TFRC offset and an up/down command.

11. The method of claim 7, wherein the downlink channel quality is a C/I, the CQ refreshment information is set to TFRC, and the CQ refinement information includes one of a power offset of the downlink channel and an up/down command.

12. A method for reporting downlink channel quality in a high-speed packet communication system, comprising the steps of:

measuring downlink channel quality from a received reference channel signal;

if a difference between the measured downlink channel quality and downlink channel quality measured in a previous TTI (Transmission Time Interval) is larger than a first threshold, determining CQ (Channel Quality) refreshment information for a downlink channel received from a Node B based on the measured downlink channel quality, and transmitting the determined CQ refreshment information to the Node B over a specific field on a predetermined channel;

if the difference between the measured downlink channel quality and the downlink channel quality measured in the previous TTI is smaller than or equal to the first threshold and larger than a second threshold, determining CQ refinement information for the downlink channel, and transmitting the determined CQ refinement information to the Node B over the specific field; and if the difference between the measured downlink channel quality and the downlink channel quality measured in the previous TTI is lower than or equal to the second threshold, performing DTX (Discontinuous Transmission) on the specific field.

13. The method of claim 12, wherein the CQ refinement information includes an offset for the CQ refreshment information.

14. The method of claim 12, wherein the downlink channel quality is a carrier-to-interference ratio (C/I), the CQ refreshment information is set to the measured C/I, and the CQ refinement information includes one of a C/I offset and an up/down command.

15. The method of claim 12, wherein the downlink channel quality is a C/I, the CQ refreshment information is set to TFRC (Transport Format and Resource Combination), and the CQ refinement information includes one of a TFRC offset and an up/down command.

16. The method of claim 12, wherein the downlink channel quality is a C/I, the CQ refreshment information is set to TFRC, and the CQ refinement information includes one of a power offset of the downlink channel and an up/down command.

17. The method of claim 12, wherein the CQ refreshment information and the CQ refinement information are transmitted with different channelization codes.

18. The method of claim 12, wherein the CQ refreshment information and the CQ refinement information are transmitted along with an indicator indicating the CQ refreshment information and the CQ refinement information.

19. An apparatus for reporting downlink channel quality in a high-speed packet communication system, comprising:

a channel analyzer for measuring downlink channel quality from a received reference channel signal;

a controller for, after measuring the downlink channel quality, determining whether a current TTI (Transmission Time Interval) is a TTI corresponding to a multiple of a first transmission period or a TTI corresponding to a multiple of a second transmission period, if the current TTI is a TTI corresponding to a multiple of the first transmission period, determining CQ (Channel Quality) refreshment information for a downlink channel received from the Node B based on the measured downlink channel quality, if the current TTI is a TTI corresponding to a multiple of the second transmission period, determining CQ refinement information for the downlink channel based on the measured downlink channel quality; and a CQ information transmitter for generating CQ refreshment information or CQ refinement information under the control of the controller, and transmitting the generated CQ refreshment information or CQ refinement information over an uplink.

20. The apparatus of claim 19, wherein the downlink channel quality is a carrier-to-interference ratio.

21. An apparatus for reporting downlink channel quality in a high-speed packet communication system, comprising:

a channel analyzer for measuring downlink channel quality from a received reference channel signal;

a controller for, after measuring the downlink channel quality, determining whether a current TTI (Transmission Time Interval) is a TTI corresponding to a multiple of a first transmission period, if the current TTI is a TTI corresponding to a multiple of the first transmission period, determining CQ (Channel Quality) refreshment information for a downlink channel received from a Node B based on the measured downlink channel quality, if the current TTI is not a TTI corresponding to a multiple of the first transmission period, determining CQ refinement information for the downlink channel only when a difference between a downlink channel quality measured in a previous TTI and the measured downlink channel quality is larger than a preset threshold; and a CQ information transmitter for generating CQ refreshment information or CQ refinement information under the control of the controller, and transmitting the generated CQ refreshment information or CQ refinement information over an uplink.

22. The apparatus of claim 21, wherein the downlink channel quality is a carrier-to-interference ratio.

23. An apparatus for reporting downlink channel quality in a high-speed packet communication system, comprising:
 a channel analyzer for measuring downlink channel quality from a received reference channel signal;
 a controller for, after measuring the downlink channel quality,
  if a difference between a downlink channel quality measured in a previous TTI (Transmission Time Interval) and the measured downlink channel quality is larger than a first threshold, determining CQ (Channel Quality) refreshment information for a downlink channel received from a Node B based on the measured downlink channel quality,
  if the difference between the downlink channel quality measured in the previous TTI and the measured downlink channel quality is smaller than or equal to the first threshold and larger than a second threshold, determining CQ refinement information for the downlink channel; and
 a CQ information transmitter for generating CQ refreshment information or CQ refinement information under the control of the controller, and transmitting the generated CQ refreshment information or CQ refinement information over an uplink.

24. The apparatus of claim 23, wherein the downlink channel quality is a carrier-to-interference ratio.

* * * * *